United States Patent
Mullaney et al.

(10) Patent No.: US 7,860,364 B2
(45) Date of Patent: Dec. 28, 2010

(54) METHODS FOR ACCESSING A FIBER WITHIN A FIBER OPTIC CABLE TO SPLICE THERETO AND TOOLS FOR USE WITH THE SAME

(75) Inventors: Julian Mullaney, Raleigh, NC (US);
Justin Everette Thompson, Angier, NC (US); Eric Troy Byrd, Willow Spring, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/194,178

(22) Filed: Aug. 19, 2008

(65) Prior Publication Data
US 2009/0060428 A1 Mar. 5, 2009

Related U.S. Application Data

(60) Provisional application No. 60/966,301, filed on Aug. 27, 2007.

(51) Int. Cl.
*G02B 6/00* (2006.01)
(52) U.S. Cl. .................. 385/136; 385/134; 385/137
(58) Field of Classification Search .............. None
See application file for complete search history.

(56) References Cited

U.S. PATENT DOCUMENTS

| | | | |
|---|---|---|---|
| 4,046,298 | A | 9/1977 | Schroeder, Jr. |
| 4,972,581 | A | 11/1990 | McCollum et al. |
| 5,278,933 | A | 1/1994 | Hunsinger et al. |
| 5,440,665 | A | 8/1995 | Ray et al. |
| 5,515,472 | A | 5/1996 | Mullaney et al. |
| 5,528,718 | A | 6/1996 | Ray et al. |
| 5,657,413 | A | 8/1997 | Ray et al. |
| 5,692,299 | A | 12/1997 | Daems et al. |
| 5,751,882 | A | 5/1998 | Daems et al. |
| 5,754,723 | A | 5/1998 | Fremgen |

(Continued)

FOREIGN PATENT DOCUMENTS

DE 42 36 251 A1 4/1994

(Continued)

OTHER PUBLICATIONS

International Preliminary Report on Patentability for corresponding PCT Application No. PCT/US2008/010048 mailed Jul. 27, 2007.

(Continued)

*Primary Examiner*—Charlie Peng
*Assistant Examiner*—Mary A El Shammaa
(74) *Attorney, Agent, or Firm*—Myers Bigel Sibley & Sajovec

(57) ABSTRACT

Apparatus for accessing a length of a selected one or more of a plurality of optical fibers within an outer protective jacket of a cable including the plurality of optical fibers and at least one strength member extending longitudinally therein include a cable positioning fixture. The cable positioning fixture is configured to receive a portion of the cable therein and to establish a desired orientation of the portion of the cable in the fixture relative to the at least one strength member therein while a cutting member removes a scalloped segment from the outer protective jacket.

31 Claims, 22 Drawing Sheets

U.S. PATENT DOCUMENTS

| | | |
|---|---|---|
| 5,883,333 A | 3/1999 | Wambeke et al. |
| 6,009,224 A | 12/1999 | Allen |
| 6,009,225 A | 12/1999 | Ray et al. |
| 6,249,632 B1 | 6/2001 | Wittmeier, II et al. |
| 6,249,633 B1 | 6/2001 | Wittmeier, II et al. |
| 6,275,640 B1 | 8/2001 | Hunsinger et al. |
| 6,424,782 B1 | 7/2002 | Ray |
| 6,507,691 B1 | 1/2003 | Hunsinger et al. |
| 6,623,181 B1 | 9/2003 | Daems |
| 6,777,617 B2 | 8/2004 | Berglund et al. |
| 7,123,801 B2 | 10/2006 | Fitz |
| 7,151,880 B2 | 12/2006 | Sartori |
| 7,155,094 B2 | 12/2006 | Donetti et al. |
| 7,162,130 B2 | 1/2007 | Castellani et al. |
| 7,166,802 B2 | 1/2007 | Cusson et al. |
| 7,174,079 B2 | 2/2007 | Abel et al. |
| 7,175,411 B2 | 2/2007 | Belli et al. |
| 7,195,807 B2 | 3/2007 | Balconi et al. |
| 7,196,270 B2 | 3/2007 | Perego et al. |
| 7,198,410 B2 | 4/2007 | Kerry et al. |
| 7,200,310 B2 | 4/2007 | Roba et al. |
| 7,204,126 B2 | 4/2007 | Sutehall |
| 7,207,208 B2 | 4/2007 | Sutehall |
| 7,208,682 B2 | 4/2007 | Kuchta et al. |
| 7,212,716 B2 | 5/2007 | Arimondi et al. |
| 7,214,882 B2 | 5/2007 | Brandi et al. |
| 7,215,857 B2 | 5/2007 | Mileo et al. |
| 7,299,659 B2 | 11/2007 | Roba et al. |
| 7,313,303 B2 | 12/2007 | Cecchi et al. |
| 7,317,858 B2 | 1/2008 | Roba et al. |
| 7,333,697 B2 | 2/2008 | Pizzorno et al. |
| 7,344,314 B2 | 3/2008 | Kerry et al. |
| 7,352,936 B2 | 4/2008 | Casals |
| 7,393,148 B2 | 7/2008 | Allen et al. |
| 2002/0168156 A1 | 11/2002 | Quiroz |

FOREIGN PATENT DOCUMENTS

| | | |
|---|---|---|
| EP | 0 822 427 A1 | 2/1998 |
| JP | 5-313018 A | 11/1993 |
| JP | 10-301002 A | 11/1998 |

OTHER PUBLICATIONS

International Search Report and Written Opinion (23 pages) corresponding to International Application No. PCT/US2008/010048; Mailing Date: Jan. 14, 2009.

"PACe—Optical Infrastructure for buildings: Network Solutions—PACe infrastructure", Division Telecom, Paris, France, www.acome.fr, 32 pages, Last download: Before Aug. 27, 2007.

Prysmian Telecom Cables & Systems, "VertiCasa—MDU Solution", 18 pages, Last Download: Before Aug. 27, 2007.

METHODS FOR ACCESSING A FIBER WITHIN A FIBER OPTIC CABLE TO SPLICE THERETO AND TOOLS FOR USE WITH THE SAME

RELATED APPLICATIONS

The present application claims priority from U.S. Provisional Application No. 60/966,301, filed Aug. 27, 2007, the disclosure of which is hereby incorporated herein in its entirety by reference.

BACKGROUND OF THE INVENTION

The present invention relates to communication cable termination systems and, more particularly, to optical fiber termination systems and methods for terminating the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

Unfortunately, the fibers within the main cable must typically be accessed at the various drop points and spliced to respective drop cables after the main cable has already been installed. Accessing the main cable for splicing generally requires careful preparation of the main cable including removing a portion of the cable sheath, and identifying and separating out predetermined fibers from within the cable without disturbing adjacent fibers. The separated fibers may then be spliced and secured within a conventional protective splice closure. Moreover, these cable access and splicing steps must typically be accomplished in the field by a technician who is likely to experience difficulties imposed by weather or the particular location of each of the drop points. Accordingly, field splicing of drop cables to a main cable is typically time consuming, expensive, and may produce low quality optical splices.

SUMMARY OF THE INVENTION

Some embodiments of the present invention provide an apparatus for accessing a length of a selected one or more of a plurality of optical fibers within an outer protective jacket of a cable including the plurality of optical fibers and at least one strength member extending longitudinally therein. The apparatus includes a cable positioning fixture configured to receive a portion of the cable therein and to establish a desired orientation of the portion of the cable in the fixture relative to the at least one strength member therein while a cutting member removes a scalloped segment from the outer protective jacket.

In other embodiments, the at least one strength member is a pair of strength members extending along opposite sides of the cable. The desired orientation is with the opposite sides of the cable including the strength members extending in a plane with each of the strength members displaced by a substantially same vertical distance from a path followed by the cutting member relative to the portion of the cable when removing the scalloped segment so that a vertical position of the strength members in the portion of the cable relative to path followed by the cutting member limits a vertical depth of the scalloped segment by substantially concurrent mechanical interference of the cutting member with both of the strength members.

In further embodiments, the cable positioning fixture includes an arched segment and the cable positioning fixture is configured to receive the portion of the cable wrapped into an arch abutting the arched segment to orient the cable in the desired orientation. The cable positioning fixture may further include a drive coupling configured to move the portion of the cable along a defined path relative to the cutting member to remove the scalloped segment from the outer protective jacket and a securing member to limit movement of the portion of the cable relative to the drive coupling while the portion of the cable is moved along the defined path. The securing member may include the arched segment.

In other embodiments, the cable positioning fixture further includes an anti-backup member configured to allow the portion of the cable to pass therethrough in a first direction to receive the portion of the cable in the cable positioning fixture and to limit movement of the portion of the cable in a second, opposite, direction. The securing member is configured to allow the drive coupling to return the securing member to the start position from the finish position without moving the portion of the cable away from the cutting member. The anti-backup member and the securing member may be configured to accommodate a selected range of diameters of cable therein.

In further embodiments, the securing member further includes a grip member. The securing member has an open position in which the portion of the cable can pass between the grip member and the arched segment and a closed position in which the portion of the cable is rigidly gripped between the grip member and the arched segment. The drive member may be further configured to move the securing member from the open position to the closed position before moving the portion of the cable along the defined path.

In other embodiments, the cable positioning fixture further includes the cutting member. The cutting member is pivotally coupled to the cable positioning member for movement between a cutting orientation selected to cut into the outer protective jacket when the portion of the cable is moved along the defined path and an extracted orientation selected to allow removal of the cutting member from the outer protective jacket.

In other embodiments, the drive coupling includes a manual drive mechanism. The drive coupling may be configured to be activated by a powered driver. The drive coupling may be configured to move the securing member with the portion of the cable secured therein from a start position to a finish position, wherein the finish position is closer to the cutting member than the start position. The drive coupling may be configured to repeatedly move the securing member with the portion of the cable therein from the start position to the finish position to provide a longitudinal length of the scalloped segment exceeding a longitudinal displacement of the portion of the cable when the securing member is moved from the start position to the finish position.

In yet further embodiments, the securing member is displaced from the arched segment and the drive coupling is configured to move the securing member with the portion of the cable secured therein from a start position to a finish position. The finish position is closer to the arched segment than the start position. The arched segment is positioned between the securing member and the cutting member. The cable positioning fixture may further include an anti-backup member configured to allow the portion of the cable to pass therethrough in a first direction to receive the portion of the cable in the cable positioning fixture and to limit movement of the portion of the cable in a second, opposite, direction. The securing member may be configured to allow the drive coupling to return the securing member to the start position from the finish position without moving the portion of the cable away from the cutting member. The anti-backup member may be a leaf spring extending from a pivot point fixed to the cable positioning fixture to an end proximate the arched segment and oriented at an angle selected to allow the portion of the cable to move along the defined path toward the cutting member and to limit movement of the portion of the cable along the defined path away from the cutting member.

In other embodiments, the cable positioning fixture includes a securing member that secures the portion of the cable wrapped into the arch around the arched segment. The cable positioning fixture includes two arched segments displaced by a distance selected to provide a desired distance between two scalloped segments removed from the cable by the cutting member without moving the portion of the main cable from its secured orientation in the cable positioning fixture.

In further embodiments, the cable positioning fixture further includes an actuable cutting member movably connected to the arched segment for movement along a defined path relative thereto to cause the cutting member to remove the scalloped segment while moving along the defined path when actuated. The cable positioning fixture may further include a drive coupling linked to the cutting member so that movement of the drive coupling moves the cutting member along the defined path. The drive coupling may be a rotary drive coupling and the fixture may further include a translation mechanism that translates rotation of the drive coupling to movement of the cutting member along the defined path.

In other embodiments, the fixture further includes a cable positioning roller coupled to the cutting member for movement therewith and oriented to press the portion of the cable into a determinate position relative to the cutting member while the cutting member removes the scalloped segment. The fixture may further include a load responsive attachment member that connects the cutting member to the arched segment to control the vertical depth of the scalloped segment by limiting penetration of the cutting member into the portion of the cable responsive to a load on the cutting member imparted by the portion of the cable during movement of the cutting member along the defined path. The fixture may further include a clamp member having a closed position that secures the portion of the cable to the arched segment and an open position that releases the portion of the cable from the arched segment. The clamp member may include a movable securing member, a clamp drive coupling and a clamp translation mechanism that translates rotary movement of the clamp drive coupling to movement of the securing member between the open and closed positions. The cable positioning fixture may further include a cutting member drive coupling linked to the cutting member so that movement of the cutting member drive coupling moves the cutting member along the defined path and a cutting member translation mechanism that translates rotary movement of the drive coupling to movement of the cutting member along the defined path. The clamp drive coupling and the cutting member drive coupling may be configured for activation by a same driver.

In yet further embodiments, the cable positioning fixture further includes a cutting member drive coupling linked to the cutting member so that movement of the cutting member drive coupling moves the cutting member along the defined path and a cutting member translation mechanism that translates rotary movement of the drive coupling to movement of the cutting member along the defined path. The translation mechanism includes a threaded screw member and a cutting member mounting block mounted on the screw member for linear movement along the screw member responsive to rotary movement of the screw member. The cutting member is connected to the cutting member mounting block.

In other embodiments, the plurality of optical fibers is an optical fiber ribbon including the selected one of the plurality of optical fibers. The apparatus includes a ribbon splitting member sized to extend movably within the outer protective jacket proximate the ribbon. The ribbon splitting member has a cutting member, at a first longitudinal end thereof, configured to travel between the selected one a plurality of optical fibers and others of the optical fibers in the ribbon. The ribbon splitting member has a second, opposite, longitudinal end displaced by a longitudinal distance selected to separate a selected length of the selected one of the plurality of fibers from the others of the optical fibers in the ribbon. Other embodiments are directed to the ribbon splitting member sized to extend movably within an outer protective jacket of a cable proximate an optical fiber ribbon extending within the outer protective jacket.

Some embodiments of the present invention provide methods of accessing an optical fiber within an optical fiber cable, including accessing a portion of the cable at a selected location. The cable includes a plurality of optical fibers and at least one strength member extending longitudinally within an outer protective jacket. The portion of the cable is secured in a fixture configured to establish a desired orientation of the portion of the cable in the fixture relative to the at least one strength member therein. A scalloped segment of the outer protective jacket is removed at a selected location on the portion of the cable while the portion is secured in the fixture without cutting any of the plurality of optical fibers or the at least one strength member to provide an opening allowing access to the plurality of optical fibers. A selected one of the plurality of optical fibers may be accessed through the opening.

In other embodiments, the cable is an outdoor cable and the at least one strength member comprises a pair of strength members extending along opposite sides of the cable. The desired orientation is with the opposite sides of the cable including the strength members extending in a plane substantially parallel to an underlying contact surface of the fixture. Removing the scalloped segment includes forming the opening to a vertical depth relative to the underlying contact surface not exceeding a vertical position of the strength members in the portion of the cable. Removing the scalloped section may include advancing a cutting member longitudinally along the portion of the cable while advancing the cutting member into the portion of the cable until the cutting member contacts the strength members to establish the vertical depth of the scalloped segment.

In further embodiments, the method further comprises removing a second scalloped segment of the outer protective jacket at a second location on the portion of the cable, longitudinally displaced from the first location, while the portion is secured in the fixture without cutting any of the plurality of optical fibers or the at least one strength member to provide a second opening. A selected one of the plurality of optical fibers is accessed through the first opening. The selected one of the plurality of optical fibers is cut at the first opening. The selected one of the plurality of optical fibers is accessed at the second opening and a length of the selected one of the plurality of optical fibers is drawn from the second opening to provide a selected length of the selected one of the plurality of optical fibers extending from the second opening to be spliced to another optical fiber.

In other embodiments, a pair of strength members extend along opposite sides of the cable and the desired orientation is with the opposite sides of the cable including the strength members extending in a plane substantially parallel to an underlying contact surface of the fixture. Removing the first scalloped segment and removing the second scalloped segment include forming the first and second openings to a vertical depth relative to the underlying contact surface not exceeding a vertical position of the strength members in the portion of the cable. The fixture may include an arched segment and securing the portion of the cable at the desired orientation may include wrapping the portion of the cable around the arched segment to orient the strength members. The fixture may include two arched portions displaced by a distance selected to provide a desired distance between the first and second openings and removing the first scalloped segment and removing the second scalloped segment may both be performed without moving the portion of the cable from its secured orientation in the fixture therebetween.

In further embodiments, removing the second scalloped segment is preceded by releasing the portion of the cable from its secured orientation in the fixture after removing the first scalloped segment. The portion of the cable is moved longitudinally relative to the fixture a distance selected to provide a desired displacement between the first and second openings. The portion of the cable is then re-secured in the fixture at the desired orientation before removing the second scalloped segment.

In other embodiments, the fixture further includes an actuable cutting member movably connected to the arched segment for movement along a defined path relative thereto. Removing the first scalloped segment and removing the second scalloped segment include actuating the cutting member to remove the scalloped segments while moving along the defined path. The fixture may further include a drive coupling linked to the cutting member so that movement of the drive coupling moves the cutting member along the defined path. The method may further include coupling a power drive to the drive coupling and actuating the power drive to move the cutting member along the defined path.

In further embodiments, the plurality of optical fibers is an optical fiber ribbon and cutting the selected one of the plurality of optical fibers includes not cutting others of the optical fibers in the ribbon. Drawing the length of the selected one of the plurality of fibers includes extending a ribbon splitting member within the outer protective jacket between the second opening and the first opening proximate the ribbon. A cutting member at a first longitudinal end of the ribbon splitting member is positioned between the cut one of the plurality of optical fibers and the other of the optical fibers in the ribbon in the first opening. A second, opposite, longitudinal end of the ribbon splitting member is pulled from the second opening to advance the cutting member within the outer protective jacket from the first opening to the second opening to separate the selected length of the one of the plurality of fibers from the others of the optical fibers in the ribbon.

In other embodiments, removing the first scalloped section and removing the second scalloped section include advancing a cutting member longitudinally along the portion of the cable on the arched segment while advancing the cutting member into the portion of the cable until the cutting member contacts the strength members to establish the vertical depth of the scalloped segments. The cable may be a main cable and the another optical fiber may be an optical fiber in a drop cable and drawing the length of the selected one of the plurality of optical fibers may be followed by splicing the selected one of the plurality of optical fibers to the optical fiber in the drop cable.

In yet further embodiment, methods for splitting an optical fiber ribbon within an outer protective jacket of a cable include extending a ribbon splitting member within the outer protective jacket between a first opening in the outer protective jacket and a second opening in the outer protective jacket proximate the ribbon. A cutting member at a first longitudinal end of the ribbon splitting member is positioned between a cut one of the plurality of optical fibers in the ribbon and other ones of the optical fibers in the ribbon in the first opening. A second, opposite, longitudinal end of the ribbon splitting member is pulled from the second opening to advance the cutting member within the outer protective jacket from the first opening to the second opening to separate a selected length of the cut one of the plurality of optical fibers from the other ones of the optical fibers in the ribbon. The selected length of the cut one of the plurality of optical fibers may be drawn from the second opening to provide a selected length of the cut one of the plurality of optical fibers extending from the second opening to be spliced to another optical fiber.

In other embodiments, methods of accessing an optical fiber within an optical fiber cable include accessing a portion of the cable at a selected location. The cable includes a plurality of optical fibers and a pair of strength members extending longitudinally within an outer protective jacket along opposite sides of the cable. The portion of the cable is arched while allowing rotation about a central axis of the cable to establish a desired orientation of the portion of the cable relative to the pair of strength members. A scalloped segment of the outer protective jacket is removed at a selected location on the portion of the cable while the portion is in the desired orientation without cutting any of the plurality of optical fibers or the pair of strength members to provide an opening. The desired orientation is with the opposite sides of the cable including the strength members positioned at a substantially same vertical position relative to a cutting member used to remove the scalloped segment. Removing the scalloped segment includes forming the opening with the cutting member to a vertical depth not exceeding the vertical position of the strength members in the portion of the cable. A selected one of the plurality of optical fibers may be accessed through the opening.

In yet further embodiments, the method further includes removing a second scalloped segment of the outer protective jacket at a second location on the portion of the cable, longitudinally displaced from the first location, while the portion is in the desired orientation without cutting any of the plurality of optical fibers or the pair of strength members to provide a second opening. Removing the second scalloped segment includes forming the second opening with the cutting member to a vertical depth not exceeding the vertical position of the strength members in the portion of the cable. A selected one of the plurality of optical fibers is accessed through the first opening. The selected one of the plurality of optical fibers is cut at the first opening. The selected one of the plurality of optical fibers is accessed at the second opening and a length of the selected one of the plurality of optical fibers is drawn from the second opening to provide a selected length of the selected one of the plurality of optical fibers extending from the second opening to be spliced to another optical fiber.

DETAILED DESCRIPTION OF EMBODIMENTS OF THE INVENTION

Figure 1:
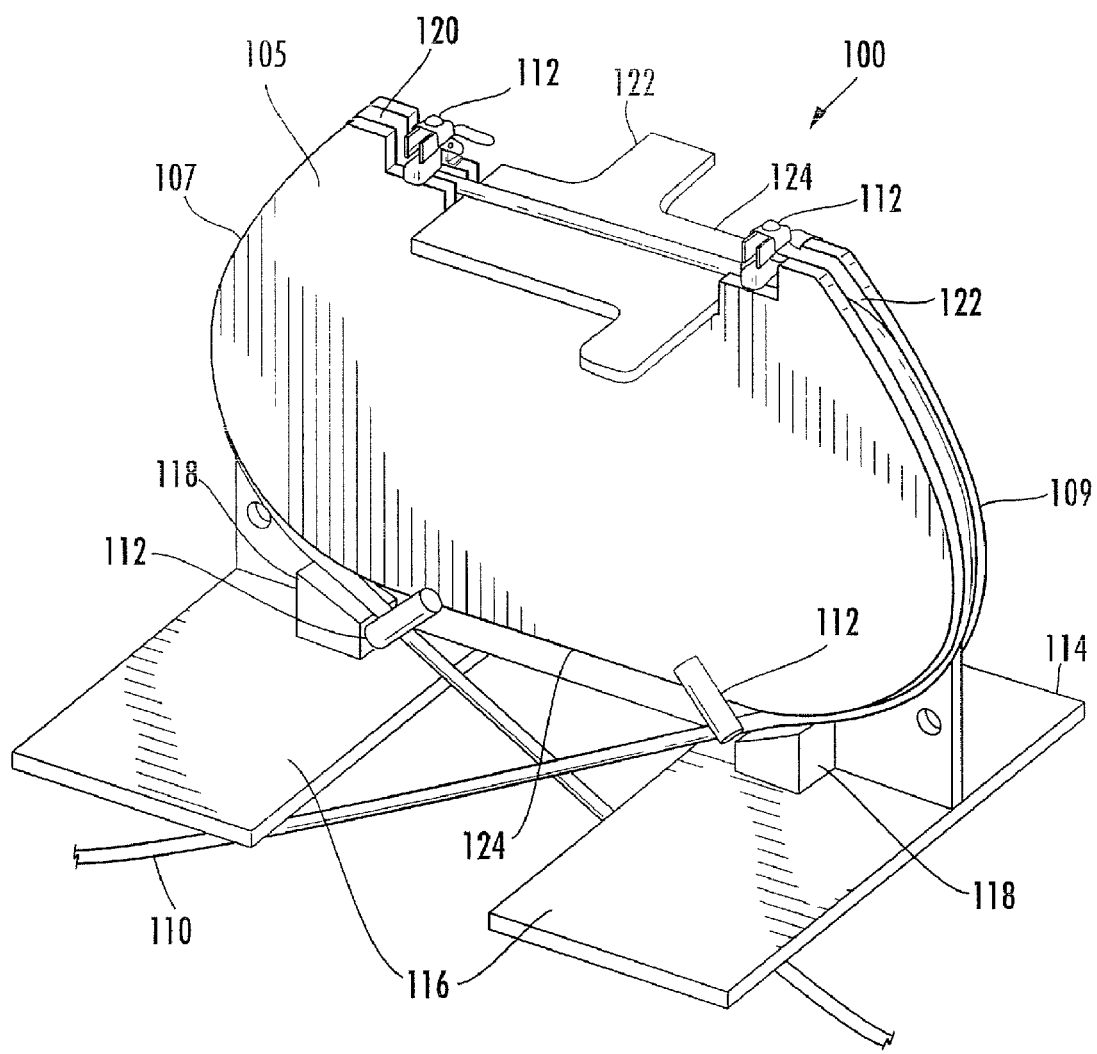
FIG. 1 is a perspective view illustrating an apparatus for accessing a length of a selected one of a plurality of optical fibers within an outer protective jacket of a cable according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide for accessing a fiber within a fiber optic cable, such as a fiber optic cable that includes a plurality of fibers therein, which may be ribbon fibers including a plurality of fibers in a ribbon arrangement, strength members and/or shielding. Embodiments of the present invention provide methods and tools that may allow for more easily entering and accessing one or several fibers within an outside plant fiber optic cable.

In some embodiments of the present invention, after a cable location where access is desired is identified, two small cable openings are made in the cable through which the fibers can be accessed. In addition, neither of the two openings requires fully removing the cable outer jacket, fully removing the ground sheath, or filly severing the strength members (i.e., a taut sheath splice may be provided). The openings are longitudinally (along the length of the cable) separated or spaced apart by a desired distance along the axis of the cable. In particular embodiments, a mandrel and knife tool device may be used to make the openings. More particularly, the mandrel and knife may be used to slice or "scallop" away a portion of the cable jacketing materials to access the fiber containing portion using a specialized cutting device, either manually or power operated. The openings may be displaced from each other by a distance approximately corresponding to the long axis of an oval mandrel device as the openings are made on the curved side portions by the knife.

In some embodiments, one or more selected fibers are sliced (cut) in one of the two openings and the sliced fiber(s) are withdrawn by pulling them from the other opening to gain access to those fibers and to provide access to a length of the fibers facilitating accessing equipment to form a splice to or connectorizing those fibers. In other words, the length between the openings may be selected to provide a desired length of the fiber(s) to work with during a subsequent operation. Thus, a fiber having a slack length greater than the size of either the first or second opening may be provided without cutting through the grounding/shielding, the strength members or the unselected fibers. As such, their continuity along the cable for electrical/magnetic/strength purposes may be maintained without cutting and re-connecting any of these members.

Thus, methods are provided of bending a central core tube type fiber optic cable around a mandrel, such that the dual strength members of the cable become oriented along the neutral axis of bending of the cable (i.e., at 3 and 9 o'clock with respect to the cross section of the cable), which allows a scalloping tool to follow an approximately arcuate path along or near the neutral axis of the cable for a distance and to ride along the strength members, which may, thus, limit or even prevent the scalloping tool from cutting more than half of the cable jacket away and limit or even prevent any damage to the fibers in the core tube by the scalloping tool.

In some embodiments, rather than sever an entire ribbon, only a partial portion of a ribbon fiber may be severed and the severed fibers may be separated from the ribbon along the length of the cable between the two openings in the cable jacketing using a ribbon separation tool shown and allowing the remainder of the ribbon to pass undisturbed and uncut along the length of cable. The ribbon separation tool in some embodiments is a tape, such as Mylar tape, with a slit hook at an end thereof (e.g., an angled cut partway across the tape). In further embodiments a wire, such as a solid, woven or twisted wire, with a hook attached or formed on an end thereof, may be used rather than a tape. Such a ribbon separation method may be advantageous, particularly as a stack of optical fiber ribbons typically is in a rotated orientation as it travels longitudinally along the cable and the ribbon splitting tape is rotated along with the ribbon stack while being pulled from the first opening to the second opening and splits the ribbon at the selected location while being pulled. Thus, some embodiments provide tools to perform the ribbon separation as described including of a plastic ribbon (such as Mylar) with length sufficient to span the distance between the two cable openings and with a slit at one end positioned to split the fibers from the ribbon when pulled through the length of cable between the two openings.

After splicing or the like, environmental integrity of the cable may be restored by applying a closure over each opening. A larger closure may be provided at the opening with the splice while a smaller closure is provided at the opening where the cut was originally made to allow drawing of the selected fiber(s).

Figure 2:
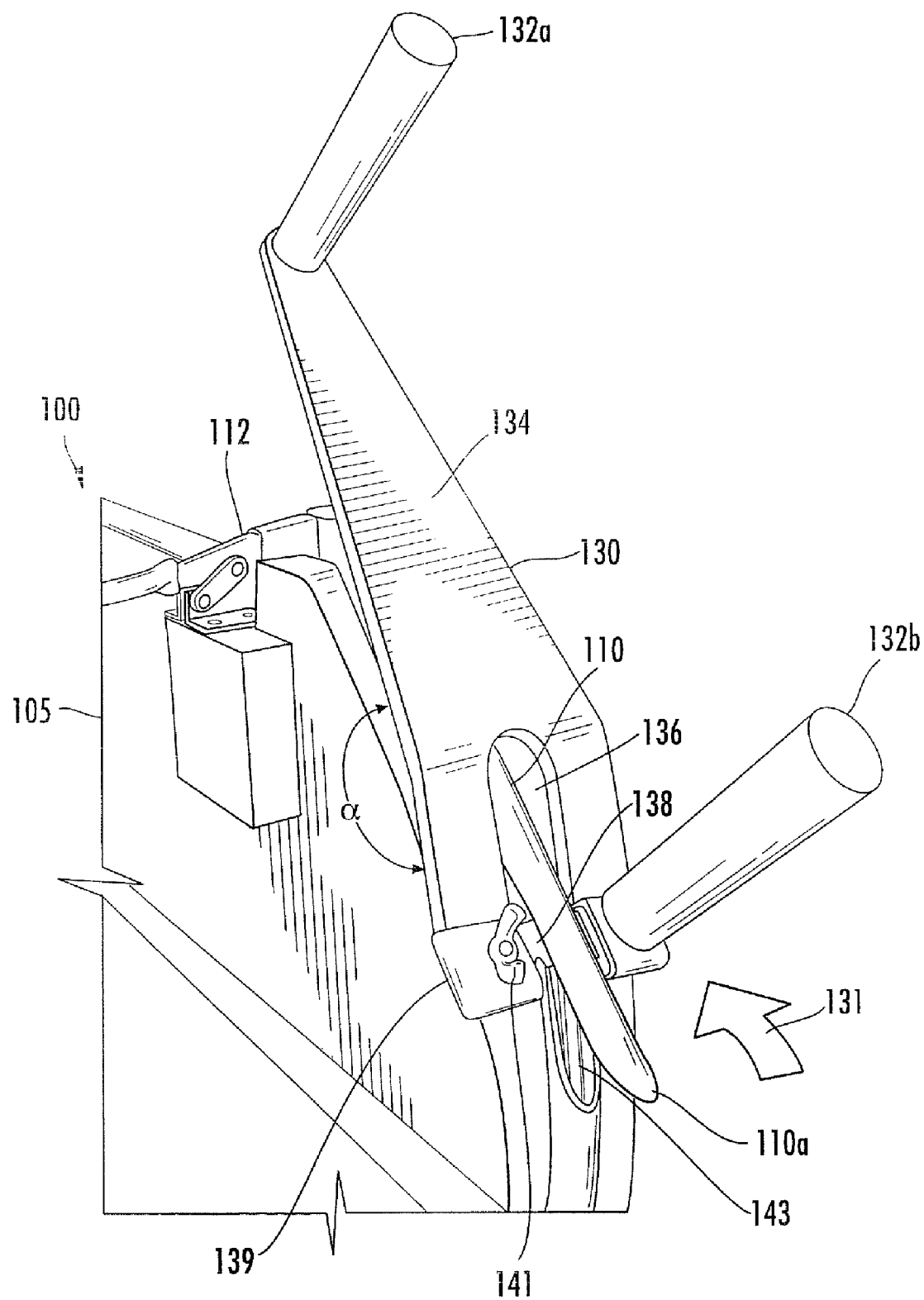
FIG. 2 is a partial perspective view of the apparatus of FIG. 1 showing a cutting member for cutting into the cable according to some embodiments of the present invention.
Figure 3:
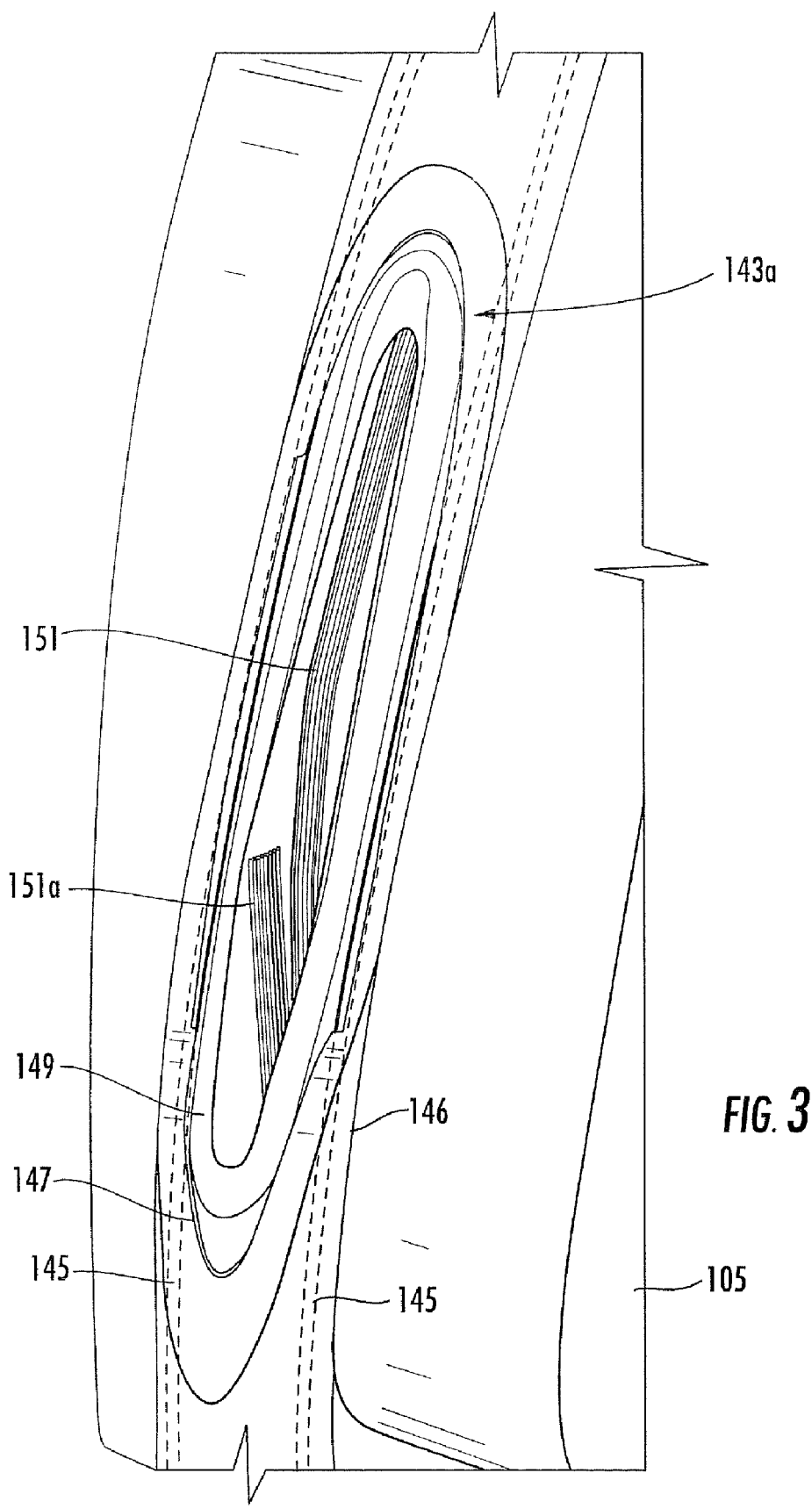
FIGS. 3-5 are perspective views showing in detail features within the cable and further illustrating methods of accessing optical fiber within an optical fiber cable according to some embodiments of the present invention.
Figure 4:
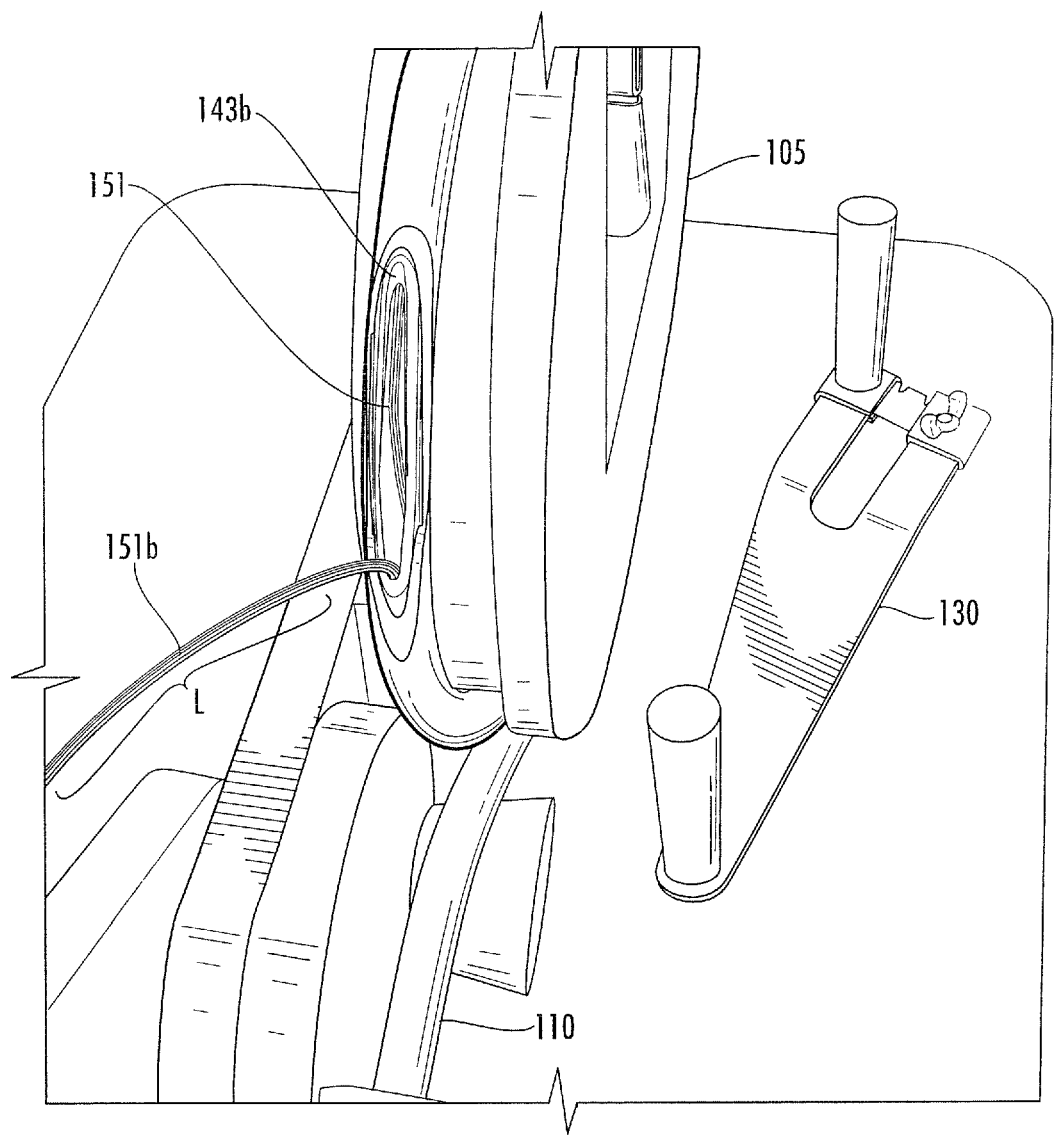
Figure 5:
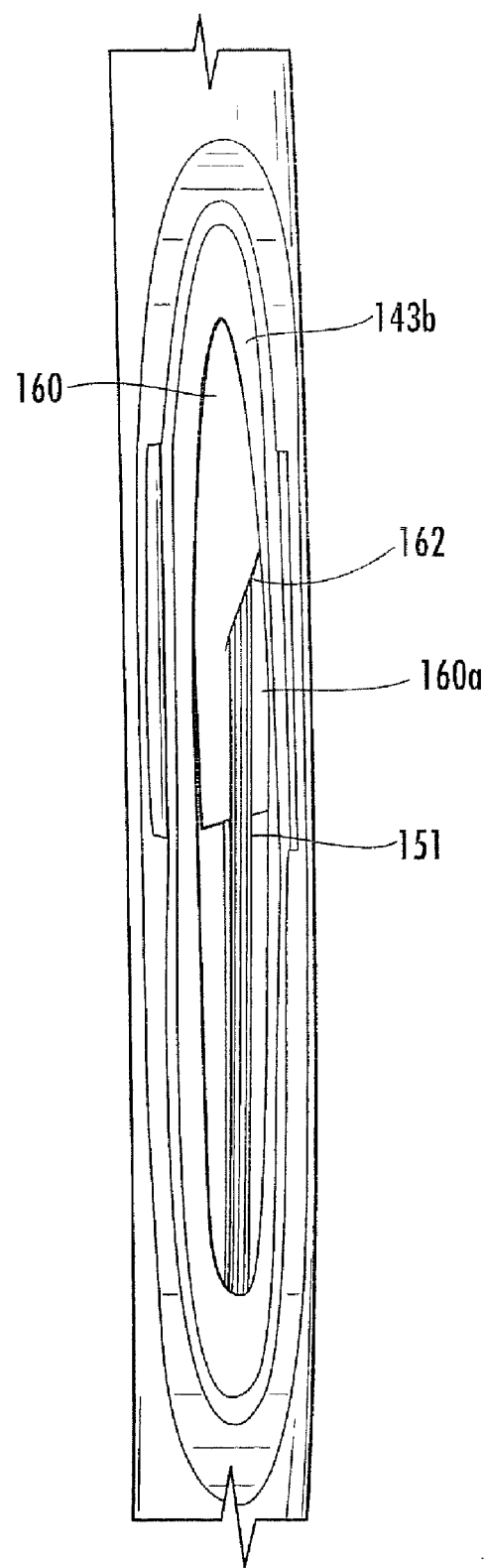

Embodiments of the present invention will now be further described with reference to FIGS. 1-5. FIG. 1 is a perspective view of an apparatus 100 for accessing a length of a selected one of a plurality of optical fibers within an outer protective jacket of a cable 110. FIG. 2 is a partial perspective view of the apparatus 100 of FIG. 1 showing a cutting member 130 for cutting into the cable 110. FIGS. 3-5 are perspective views showing in detail features within the cable 110 and further illustrating methods of accessing optical fiber within an optical fiber cable according to some embodiments of the present invention.

Referring first to FIGS. 1 through 3, the apparatus 100 includes a cable positioning fixture 105 configured to receive a portion of an optical fiber cable 110 therein. The cable positioning fixture 105 establishes a desired orientation of a portion of the cable 110 in the fixture 105 relative to one or more strength members extending within the cable 110 while the cutting member 130 removes a scalloped segment 110a from an outer protective jacket of the cable 110.

As best seen in FIG. 3, the cable 110 may include an outer protective jacket 146, a metal shield layer 147, a buffer tube 149 and a plurality of optical fibers within the buffer tube 149, shown as optical fiber ribbons 151 in FIG. 3. Also shown in the cable 110 in FIG. 3 is a pair of strength members 145 extending along opposite sides of the cable 110. The various described features of the illustrated cable 110 in FIG. 3 are visible in an opening 143a formed by removing the scalloped segment 110a.

For the embodiments of the apparatus 100 shown in FIGS. 1 and 2, the cable positioning fixture 105 is mounted on a ground support structure 114. The ground support structure 114 includes two foot placement regions 116 where a user may position their feet to steady the fixture 105 when installing the cable 110 therein. For the embodiments illustrated in FIG. 1, the fixture 105 is a generally race track (oval) shaped structure including two arched portions 107, 109 displaced from each other by straight regions 124. A shelf region 122 is shown on the upper straight region 124 in the embodiments of FIG. 1.

A channel shaped region 120 is shown in the arched segments 107, 109 that defines a contact surface receiving the cable 110 when the cable is secured in the fixture 105. Also shown in the embodiments of FIG. 1 are four clamps 112 that may be used to fixedly secure the cable 110 in the fixture 105 in the desired orientation before using cutting member 130 to remove the scalloped segment 110a. As used herein, references to a contact surface for the cable 110 in the fixture refers to a contact portion or points between the receiving region, such as the u-shaped channel 120, and the cable 110. For example, a U-shaped channel 120 (or v-shaped or the like channel) will generally have two contact points with the cable 110 on respective sides of the channel, which points of contact define a plane of the contact surface as used herein. Moreover, in some embodiments, a single point of contact may be provide by a channel surface or the like having sufficient width to fully receive or orient the cable 110 with respect to a single point of contact. In such embodiments, an associated plane of the contact surface refers to a plane extending substantially perpendicular to a central cross-sectional axis of the cable 110 as secured in the fixture 105.

As used herein, the contact surface may be used as a reference point for describing the desired orientation. For example, with respect to the cable 110 illustrated in FIG. 3 having a pair of strength members 145 extending along opposite sides of the cable, the desired orientation in some embodiments is with the opposite sides of the cable 110 including the strength members 145 extending in a plane substantially parallel to the abutting contact surface of the fixture so that a vertical position of the strength members 145 in the cable 110 relative to the abutting contact surface limits a vertical depth of the scalloped segment 110a relative to the abutting contact surface by substantially concurrent mechanical interference of the cutting member 130 with both of the strength members 145.

It will be understood that for a cable 110 including strength members 145 arranged as in FIG. 3, wrapping of the cable 110 into an arch abutting the arched segment 107, 109 orients the cable 110 in the desired position. In particular, for such arrangements of strength members as seen in FIG. 3, the cable 110 is generally highly resistant to bending along a first axis corresponding to a plane defined by the strength members 145 and more flexible and bendable in a plane perpendicular thereto. As a result, bending of the cable 110 around the arched section 107, 109 may naturally orient the cable 110 relative to the strength members 145.

Referring now to FIGS. 3-5, a method of accessing a length of a selected one of a plurality of optical fibers 151 using the apparatus 100 will be further described according to some embodiments of the present invention. FIGS. 3-5 will be used to describe a method involving the formation of two longitudinally displaced openings 143a, 143b in the cable 110. However, it will be understood that, in some embodiments of the present invention, a single opening may be used to access the selected length of one of the fibers 151.

A first opening 143a is shown in FIG. 3 and a corresponding second opening 143b is shown in FIG. 4. As seen in FIG. 3, a selected one or more of the plurality of optical fibers 151a is accessed through and cut at the first opening 143a. As seen in FIG. 4, the selected one of the plurality of optical fibers is accessed at the second opening and a length L of the selected one of the plurality of optical fibers 151b is drawn from the second opening 143b to provide a selected length L of the one or more fibers 151b.

Referring again to FIG. 1, respective upper and lower ones of the securing members 112 secure the cable 110 wrapped into an arch around the respective arched segments 107, 109. The two arched segments 107, 109 are displaced by the straight segments 124 a distance selected to provide a desired distance between the first and second openings 143a, 143b formed by removing two respective scalloped segments from the cable 110 using the cutting member 130. As such, for the fixture 105, two scalloped segments longitudinally displaced along the cable 110 may be removed without moving the cable 110 from its secured orientation in the cable positioning fixture 105. However, it will be understood that the fixture 105 may also be used to remove only a single scalloped segment 110a on one of the arched segments 107, 109 or two segments, both using a single one of the arched segments 107, 109, while moving the cable 110 a desired distance and re-securing it between removal of the respective scalloped segments 110a.

As shown in FIG. 5, in some embodiments of the present invention, the apparatus 100 further includes a ribbon splitting member 160. The ribbon splitting member 160 is sized to extend movably within the outer protective jacket 146 proximate the optical fiber ribbon 151. The ribbon splitting member 160 has a cutting member 162 at a first longitudinal end 160a thereof. The cutting member 162 is configured to travel between ones of a plurality of optical fibers in a ribbon and others of the optical fibers in the ribbon. A second, opposite longitudinal end of the ribbon splitting member 160 is displaced from the first end 160a by a distance selected to separate a selected length of the cut one(s) of the plurality of fibers from others of the optical fibers in the ribbon. In other words, the ribbon member splitting member 160 may have sufficient length to pass the full distance between the respective openings 143a, 143b so that it may be pulled therebetween to separate out a cut (or to be cut) one or more of the optical fibers within a selected ribbon 151a the entire distance between the respective openings 143a, 143b.

As seen in FIG. 5, the cutting member 162 may be an angled slit extending partially across the width of the ribbon splitting member 160. The ribbon splitting member 160 may be a plastic material, such as Mylar or polypropylene, or may be a wire, wire mesh, twisted wire, braided wire or the like, and the respective fibers within the ribbon 151 are to be separated from each other may be respectively routed under or over the end 160a of the ribbon splitting member 160 as shown in FIG. 5. As a result, when the ribbon splitting member 160 is pulled back towards the opening 143a from the opening 143b, an individual ribbon 151 may be split into two separate ribbons between the two openings 143a, 143b. It will be understood that such a ribbon splitting operation may be provided either by passing the ribbon splitting member from the opening 143a to the opening 143b or vice versa.

Figure 6:
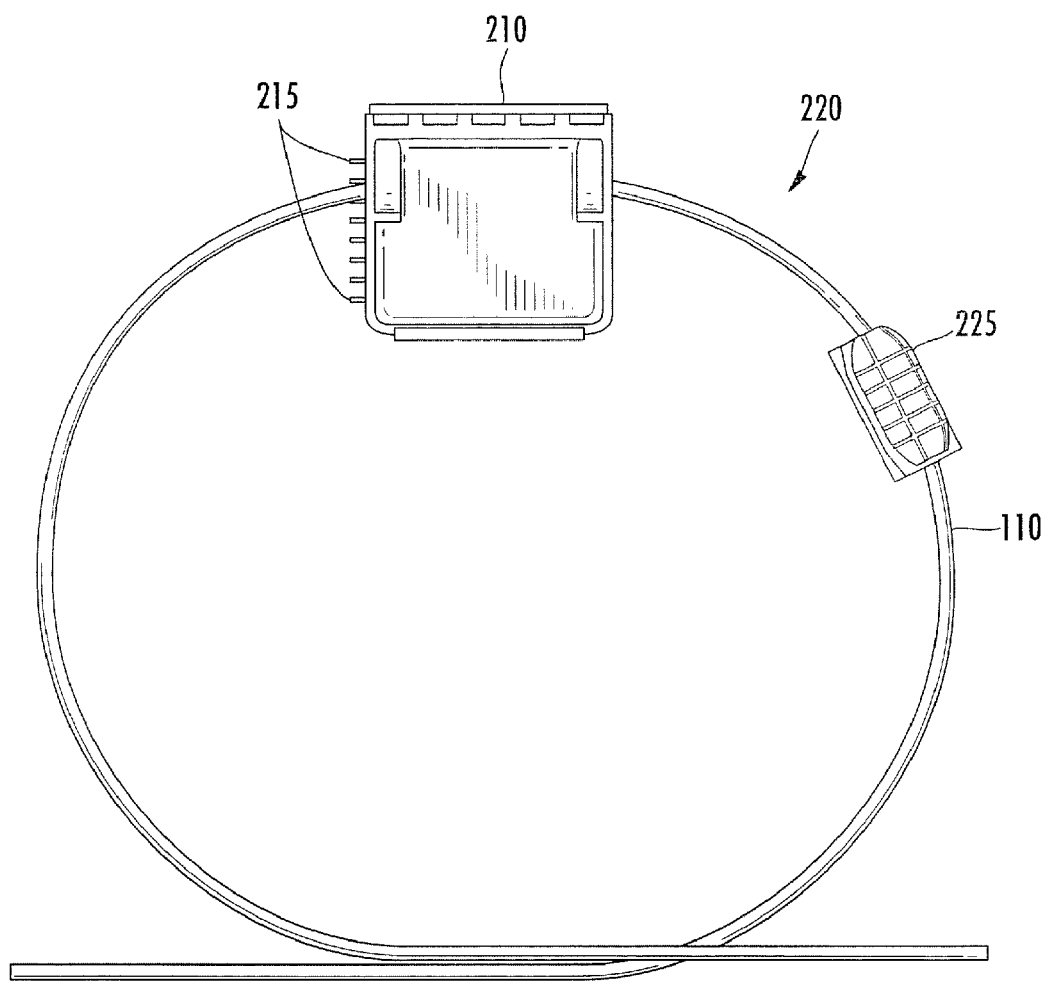
FIG. 6 is a plane view illustrating a splice closure assembly including a first closure and a second closure applied to a cable according to some embodiments of the present invention.

After a length of a cut one or more of the plurality of optical fibers 151 are drawn through the opening 143b, it will be understood that the respective selected fiber or fibers may be spliced to an optical fiber or fibers in a drop cable or drop cables and the splices and openings may then be environmentally protected. For example, FIG. 6 illustrates a splice closure assembly 200 including a first closure 205 and a second closure 210 applied to a cable 110. The first closure 205 is a low-volume, in-line closure provided to environmentally seal the first opening 143a where the selected fiber or fibers are originally cut. The larger second closure 210 is configured to cover the second opening 143b where a selected length L of the fiber or fibers 151b are drawn. Splices to respective drop cables 215 may be accommodated on a splice tray or the like within the second closure 210. A closure kit including the first closure 205 and the second closure 210 may also be provided in some embodiments of the present invention. However, as noted above, in some embodiments only a single opening 143 is provided and a pair of closures may not be needed and a single closure, such as the second closure 210, may be used to accommodate splices.

Figure 7A:
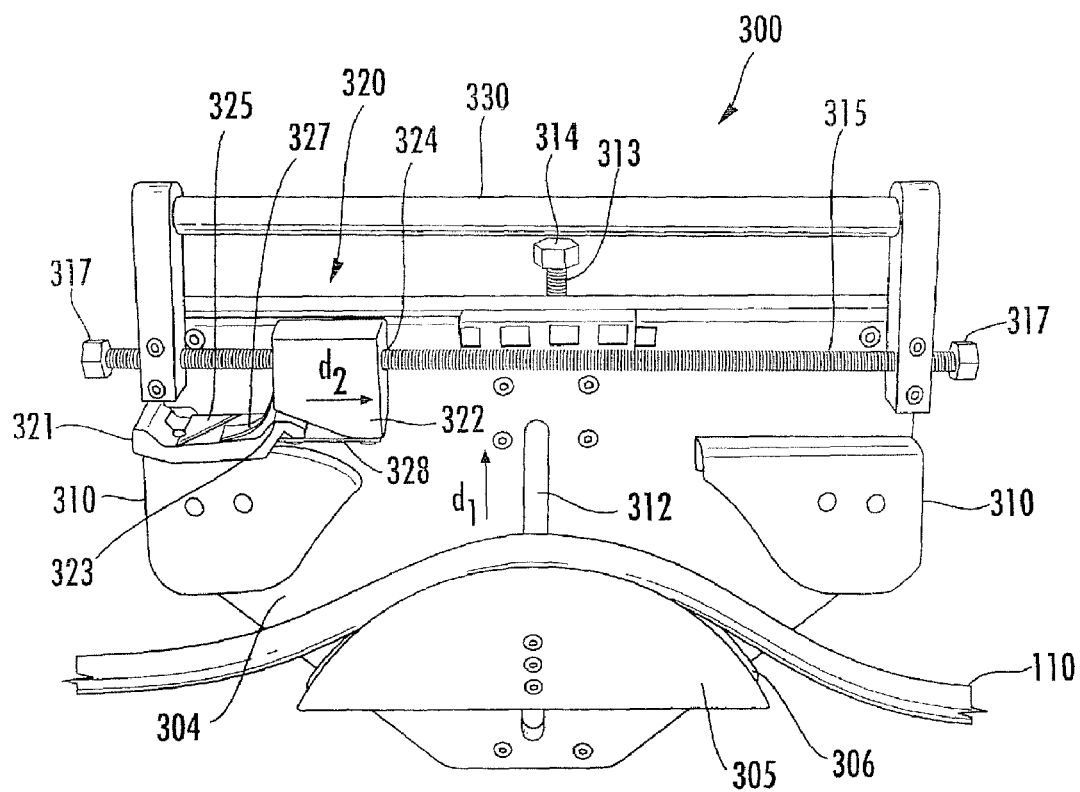
FIG. 7A is a perspective view of an apparatus for accessing a length of a selected one of a plurality of optical fibers within an outer protective jacket of a cable in the open position before arching of the cable to the desired orientation according to some embodiments of the present invention.
Figure 7B:
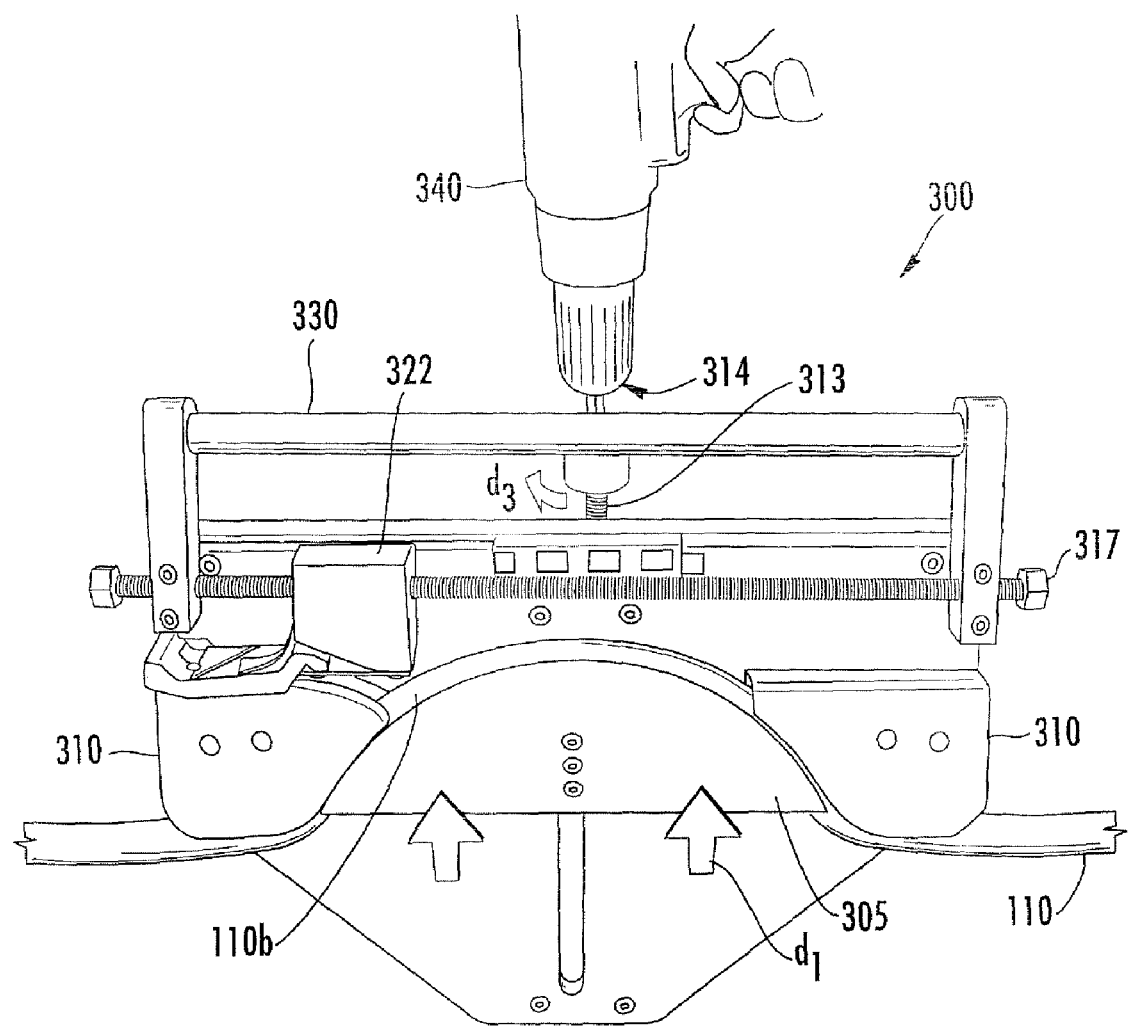
FIG. 7B is a perspective view of the apparatus of FIG. 7A after arching of the cable.
Figure 7C:
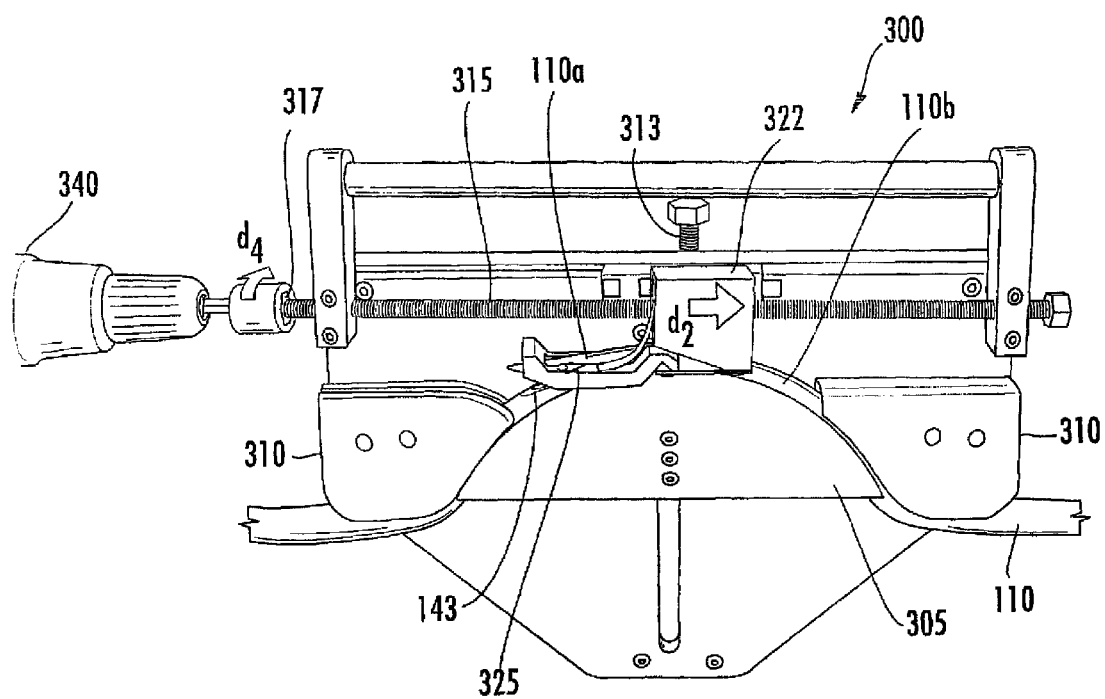
FIG. 7C is a perspective view of the apparatus of FIG. 7A with a scalloped segment of the outer protective jacket being removed by an actuable cutting member.
Figure 8A:
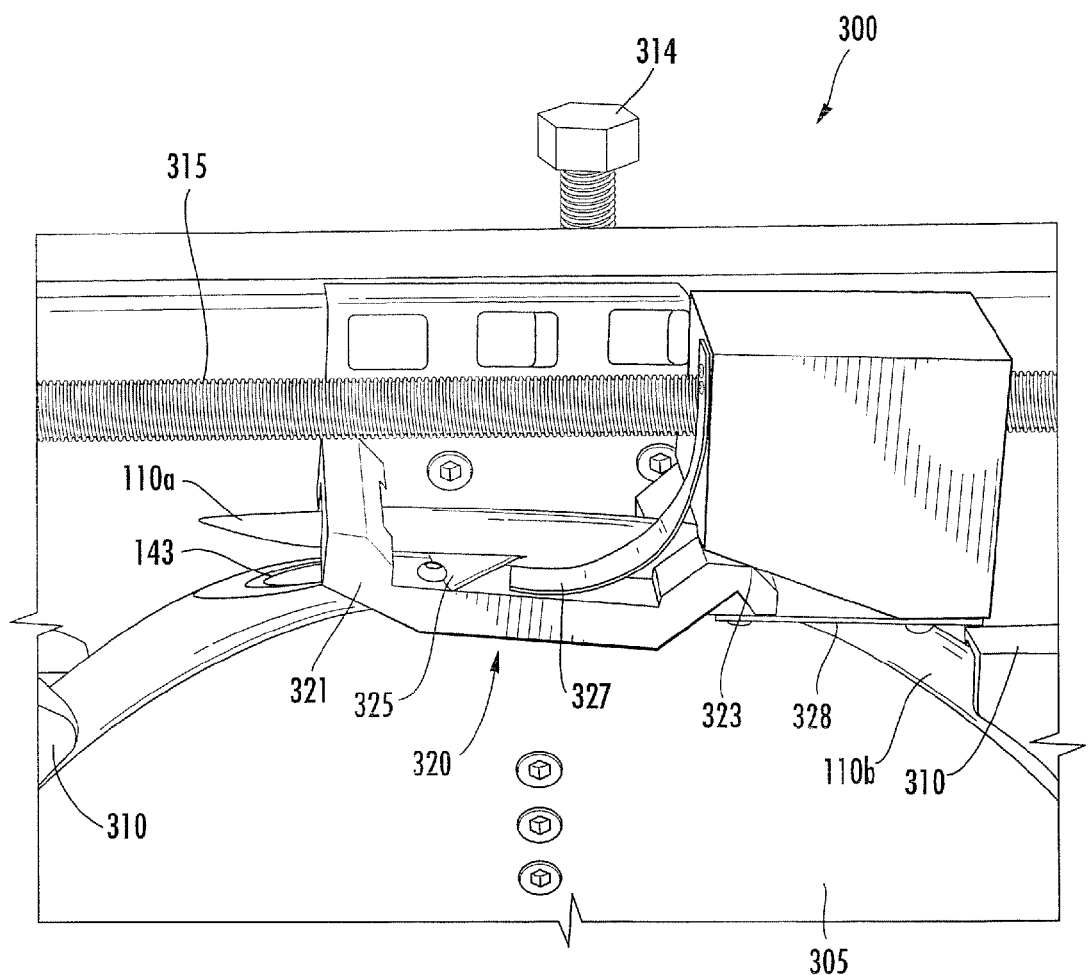
FIG. 8A is a perspective view further illustrating the cutting member of FIG. 7C.
Figure 8B:
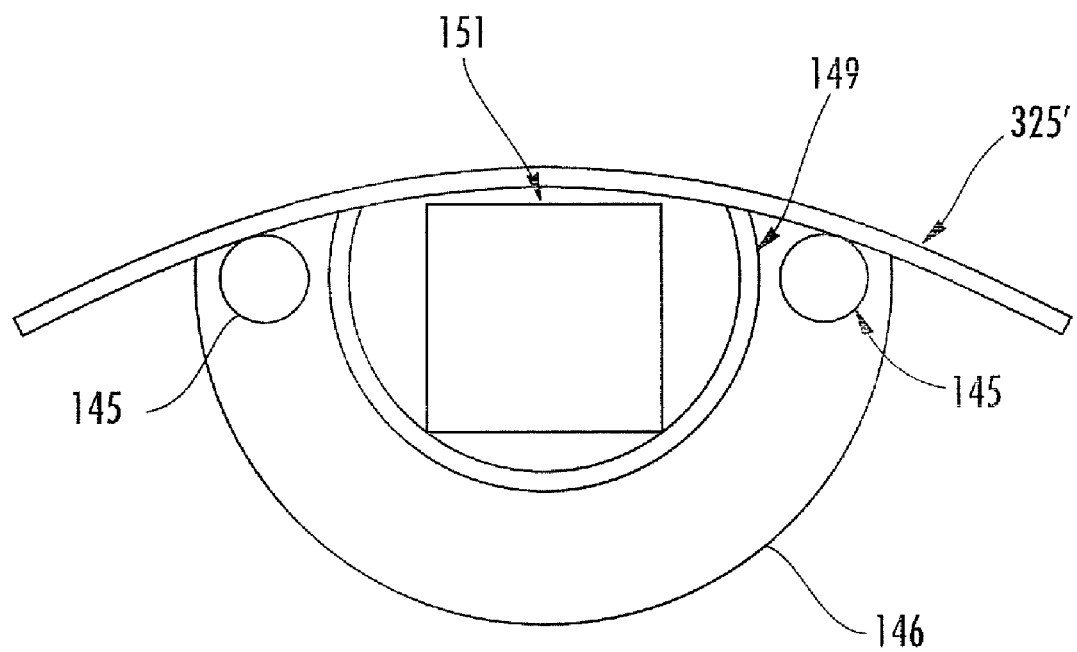
FIG. 8B is a schematic cutaway view showing an arched cutting blade according to some embodiments of the present invention.

Further embodiments of the present invention will now be described with reference to FIGS. 7A-7C and FIGS. 8A-8B. FIG. 7A is a perspective view of an apparatus 300 for accessing a length of a selected one of a plurality of optical fibers 151 within an outer protective jacket 146 of the cable 110 in the open position before arching of the cable 110 to the desired orientation. FIG. 7B is a perspective view of the apparatus 300 after arching of the cable 110. It will be understood that, in some embodiments as applied to typical central core cables with side positioned strength members, the device will be self-orienting during the operation illustrated in FIG. 7B to position the strength members properly, similar to the effect of manually wrapping the cable around the mandrel of FIG. 1. FIG. 7C is a perspective view of the apparatus 300 with a scalloped segment 110a of the outer protective jacket 146 being removed by an actuable cutting member 320. FIG. 7C illustrates the scalloping of the jacket, activated by a power tool, with the tool engaged to a drive member so as to rotate a drive rod to move the scalloping knife holder in a longitudinal direction relative to the cable. In other words, the drive rod itself rotates with linear movement while the scalloping knife holder moves linearly with rotating during the operation shown in FIG. 7C. FIG. 8A is a perspective view further illustrating the cutting member 320 of FIG. 7C.

For the embodiments of the apparatus 300 illustrated in FIG. 7A-7C, the apparatus 300 includes an arched segment 305 that is moveable from the open position of FIG. 7A to the closed position of FIG. 7B, in which the arched segment 305 and a pair of securing members 310 receive a portion 110b of the cable 110 therebetween to establish desired orientation of the portion 110b of the cable 110 in the fixture 300 relative to the strength member or members 145 therein. The apparatus 300 further includes a base plate 304 to which the securing members 310 are rigidly affixed and to which the arched segment 305 is moveably attached.

The apparatus 300 further includes the actuable cutting member 320 and a handle 330. The handle 330 may be used by a field technician or other user to hold the apparatus 300 while the scalloped segment 110a is being removed. Furthermore, the embodiments illustrated in FIGS. 7A-7C may be used for in-ground applications in the orientation illustrated in the Figures or may be held with the handle 330 below the arched segment 305 for use in overhead applications in the field.

The actuable cutting member 320 is moveably connected to the arched segment 305 by the base plate 304 for movement along a defined path relative thereto to cause the cutting member 320 to remove the scalloped segment 110a while moving along the defined path when actuated as illustrated in FIG. 7C. More particularly, for the illustrated embodiments, the cutting member 320 includes a cutting member mounting block 322 including a threaded bore 324 so that the cutting member 320 is mounted on a threaded screw member (rod) 315 for a linear movement along the screw member 315 responsive to rotary member of the screw member 315.

A cutting member drive coupling, shown as a respective first and second hexagonal drive nut 317, is coupled to the threaded screw member 315. The threaded bore 324 of the cutting member mounting block 322, in combination with the threaded screw member 315, provide a cutting member translation mechanism that translates rotary movement of the drive coupling 317 to movement of the cutting member 320 along the defined path. In FIGS. 7A-7C, the defined path is in the direction $d_2$ and is a linear travel path.

FIG. 7A shows the arched segment 305 in an open position and FIG. 7B shows the arched segment 110b in a closed position. Thus, the arched segment 305 in combination with a clamp drive coupling 314 and clamp translation mechanism 313 define a clamp member having a closed position that secures the portion 110b of the cable 110 to the arched segment 305 and an open position that releases the portion 110b of the cable 110 from the arched segment 305 as illustrated in FIGS. 7B and 7A, respectively. The clamp drive coupling 314 and the clamp translation mechanism 313 translate rotary movement of the clamp drive coupling 314 to movement of the clamp member between the open and closed positions. Furthermore, for the illustrated embodiments of FIGS. 7A-7C, the cutting member drive coupling 317 and the clamp drive coupling 314 are configured for activation by a same driver, shown as a battery powered electronic drill 340 in FIGS. 7B and 7C.

Figure 9:
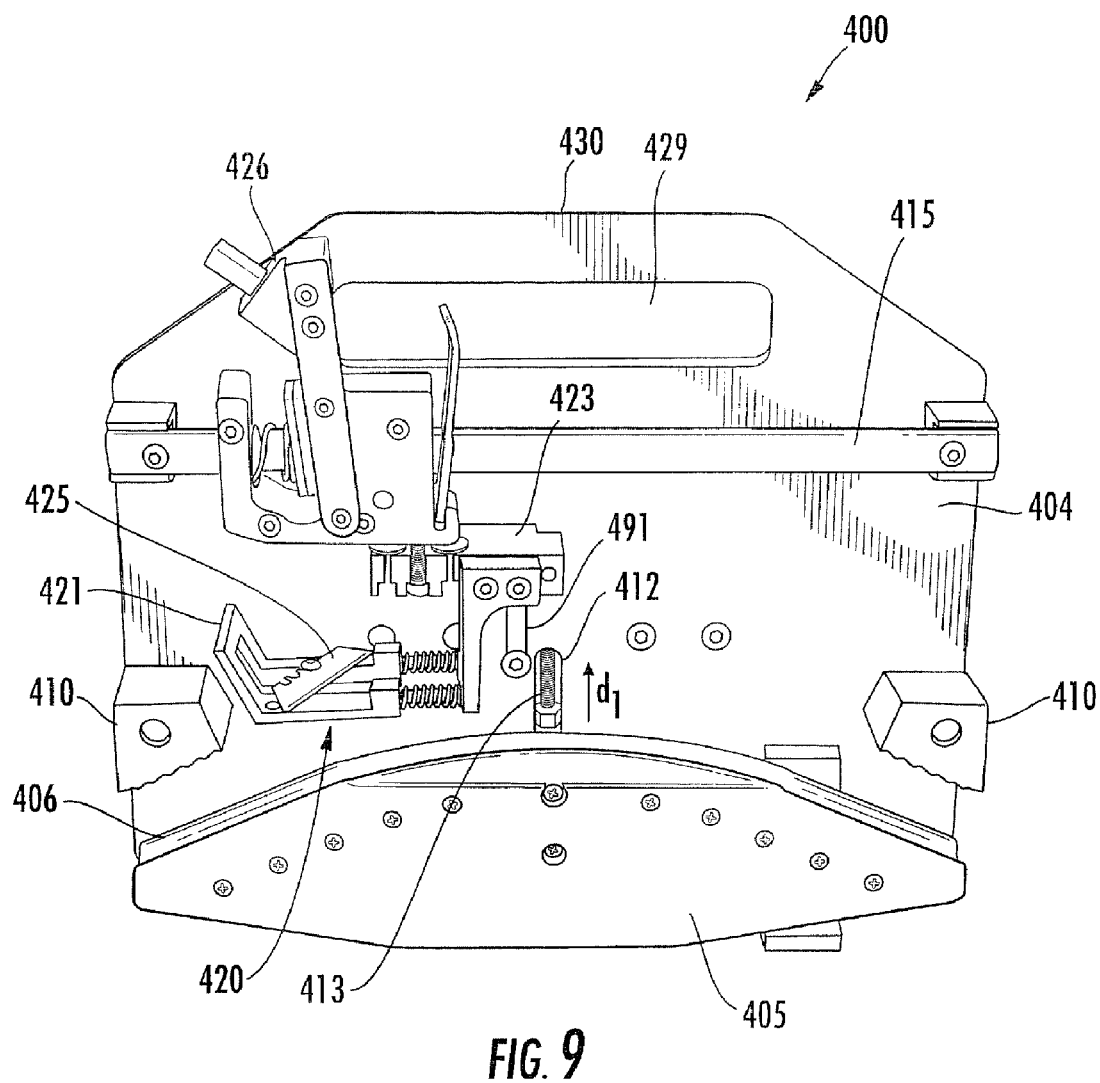
FIG. 9 is a perspective view of an apparatus for accessing a length of a selected one of a plurality of optical fibers within an outer protective jacket of a cable according to further embodiments of the present invention.

Referring now to FIG. 8A, the cutting member 320 includes a cutting sled 321 coupled to the cutting member mounting block 322 through a load responsive attachment member, shown as a leaf spring member 328 in the embodiments of FIG. 8A. The leaf spring member 328 may be two leaf springs positioned on opposite sides of the cable portion 110b, only one of which is shown in FIG. 8A. A leaf spring member 327 provides a down force onto the cutting sled 321 to cause a cutting blade 325 to cut into the cable portion 110b at a desired angle. The cutting blade 325 is removably attached to the cutting sled 321 for movement therewith. The cutting sled 321 is free to pivot toward or away from the portion 110b of the cable 110 about a pivot point 323 between the cutting sled 321 and the leaf spring member(s) 328. The cutting sled 321, in some embodiments, does not contact the mounting block 322 during cutting of the opening 143 in the cable 110. The leaf spring member(s) 328 may be selected and mounted so that the penetration of the cutting blade 325 of the cutting member 320 into the cable 110 may be limited responsive to a load imparted on the cutting sled 321 by the portion 110b of the cable 110 during movement of the cutting member 320 along the defined path. The limited flexibility for rotational movement of the cutting sled 321 may also facilitate entry of the blade 325 into the cable 110 and exit therefrom when removing the scalloped segment 110a to define the opening 143 by controlling the vertical depth of the removed scalloped segment 110a. Such an arrangement may further limit the risk of damage to the strength members 145 while the blade 325 travels along the strength members 145 while cutting the scalloped segment 110a. While the blade 325 is shown in FIG. 9 as a straight blade set on a 45 degree angle, in some embodiments the blade 325 may be a straight blade normal to the axis of the cable and/or may be an arched blade (with a greater displacement from the centerline of the cable 110 in the middle than on either side) designed to ride along the top of the strength members, which may provide more relief for the inner core tube of the cable 110. Such an arched blade 325' is shown, for example, in FIG. 8B.

Further embodiments of an apparatus 400 for accessing a length of a selected one of the plurality of optical fibers within a cable will now be described with reference to the perspective view of FIG. 9. Like numbered items in FIG. 9 are configured and operate substantially as described with reference to corresponding numbered items in FIG. 7A-7B (e.g., 305, 405). Accordingly, only different aspects of the embodiments illustrated in FIG. 9 will be further described in detail herein.

The embodiments of FIG. 9 differ from the embodiments of FIG. 7A-7C in the inclusion of a manual drive member 426 coupled to a cutting member 420. A manual drive member may receive a lever arm, such as a crowbar, to provide leverage for ratchet activation of the cutting member 420 along the track bar 415. Thus, each stroke of the manual drive member 426 moves the cutting member 420 in step increments along the track bar 415.

The embodiments of FIG. 9 further include a cable positioning roller 491 coupled to the cutting member 420 through a linkage assembly 423. The cable positioning roller 491 moves with the cutting member 420 and is oriented to press the portion of the cable 110b into a determinant position relative to the cutting member 420 while the cutting member 420 removes the scalloped segment 110a. In other words, the cable positioning roller 491 may press the cable portion 110b against the contact surface channel 406 to assure a predictable positioning of the cable portion 110b while being cut by the blade 425.

The embodiments of FIG. 9 further differ from the embodiments of FIG. 7A-7C in that a handle 430 is formed from a portion of a plate 404. More particularly, an opening 429 is provided in the plate 405 to define the handle 430.

Figure 10:
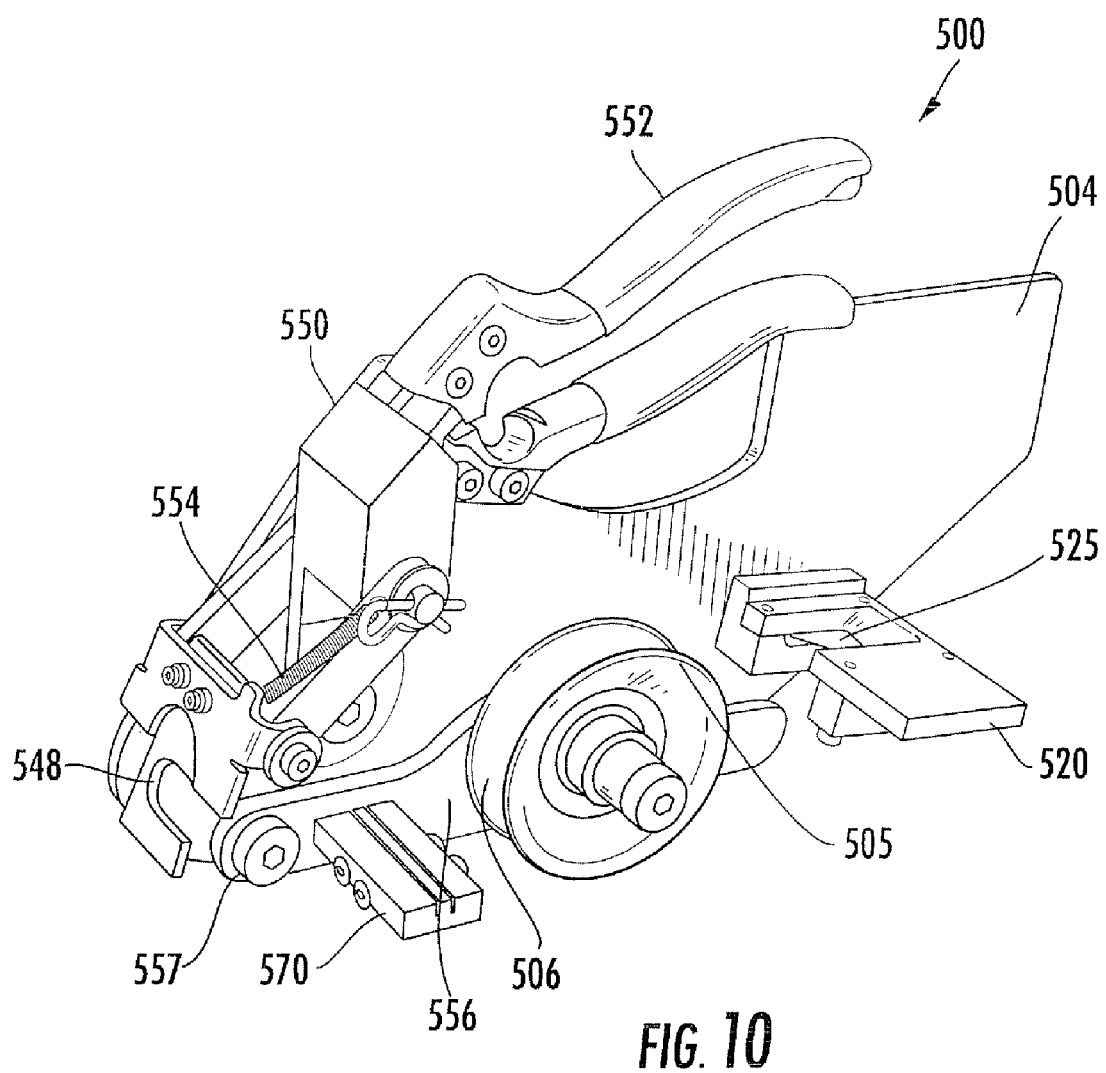
FIG. 10 is a perspective view of an apparatus for accessing a length of a selected one of a plurality of optical fibers within an outer protective jacket of a cable according to further embodiments of the present invention.

Further embodiments of the present invention will now be described with reference to FIGS. 10-13B. As seen in the embodiments of FIG. 10, the apparatus includes an arched segment 505, shown as a pulley including a U-shaped channel defining a contact surface 506 in FIG. 10. The pulley 505 is coupled to a base plate 504 through the plate member 556 and the bolt 557, about which the plate member 556 may be pivoted to move the pulley 505 relative to the base plate 504. Also attached to the base plate 504 is a cutting member 520 holding a cutting blade 525. A drive coupling 550 is also coupled to the base plate 504. The drive coupling 550 is configured to move the portion 110b of the cable 110 along a defined path relative to the cutting member 520 to remove the scalloped segment 110a from the outer protective jacket 146. A securing member 548 including a U-shaped cable receiving slot is configured to limit movement of the portion of the cable 110 therein relative to the drive coupling 550 while the cable 110 is moved along the defined path. The drive coupling 550 is configured to move the securing member 548 with a portion of the cable 110 secured therein, from a start position, shown in FIG. 10, to a finish position. The finish position is closer to the cutting member 520 than the illustrated start position. As a result, the cable 110 is moved past the cutting blade 525 in stepwise lengths each time the securing member 548, is advanced from the start to the finish position.

A manual drive mechanism 552, shown as hand actuable handles in the embodiments of FIG. 10, activates the drive coupling 550 to move the securing member 548 from the start to the finish position. Thus, the drive coupling 550 is configured to repeatedly move the securing member 548, with the cable 110 secured therein, from the start position to the finish position to provide a longitudinal length of the scalloped segment 110a exceeding a longitudinal displacement of the cable 110 when the securing member 548 is moved from the start position to the finish position a single time.

Also shown in the embodiments of FIG. 10 is a spring mechanism 554 coupling the securing member 548 to the drive coupling 550. The spring assembly 554 allows for pivotal movement of the securing member 548 relative to the drive coupling 550. Such an arrangement allows the cable 110 to stay in a substantially fixed position relative to the cutting member 520 when the drive coupling 550 moves the securing member 548 back from the finish position to the start position to allow for additional repeated movements of the securing member 548 to result in incremental continued advancement of the cable 110, rather than simply moving a fixed portion of the cable back and forth repeatedly.

Also shown in the embodiments of FIG. 10 is a plate 570 coupled to the plate member 556. The plate member 570 is configured to receive a leaf spring therein and may operate as an anti-backup member as will be described more fully with reference to an anti-backup member 670 shown in FIG. 11.

Figure 11:
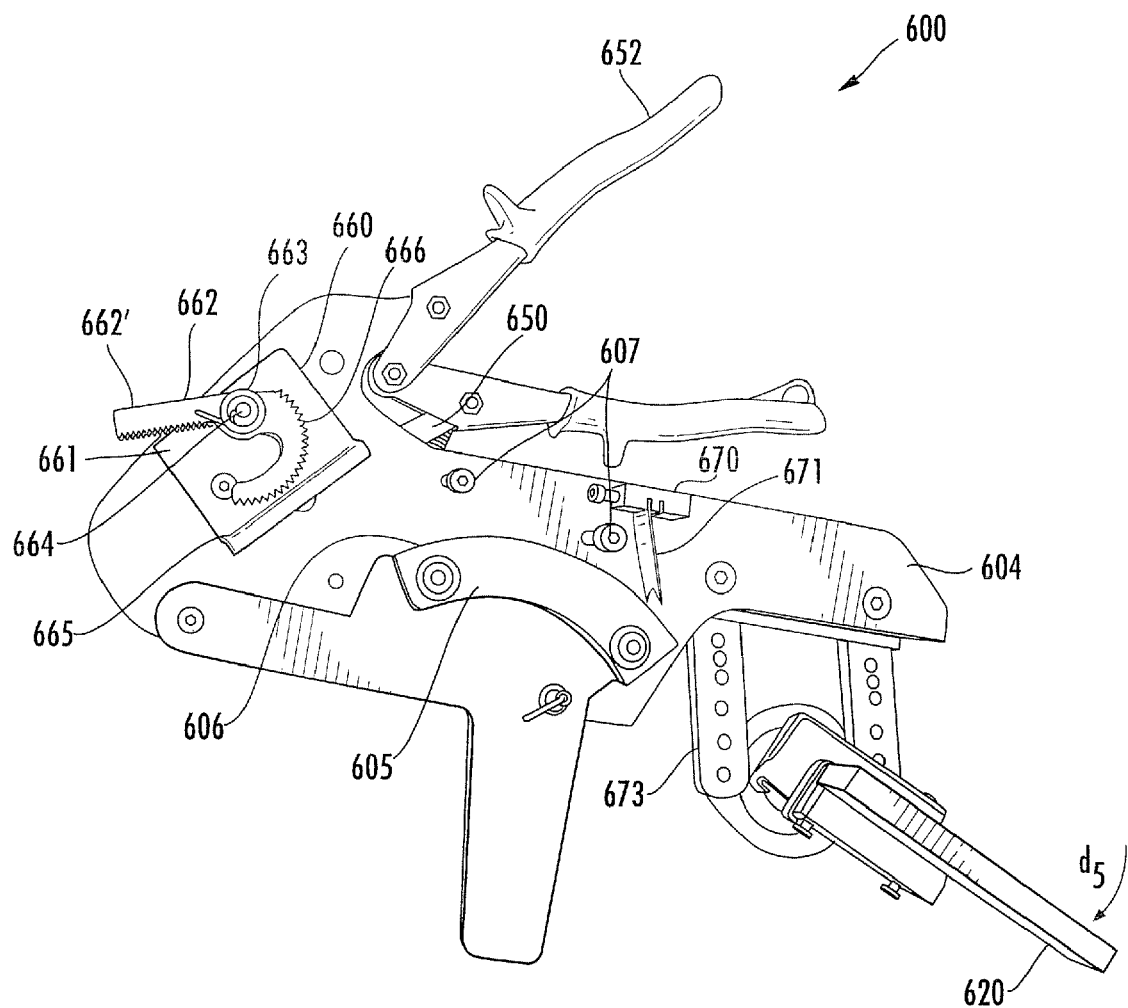
FIG. 11 is a perspective view of an apparatus for accessing a length of a selected one of a plurality of optical fibers within an outer protective jacket of a cable according to further embodiments of the present invention.

Further embodiments of the present invention will now be described with reference to the perspective view of FIG. 11. As shown in FIG. 11, the apparatus 600 for accessing a length of a selected one of a plurality of fibers in a cable 110 includes an arched segment 605 that is fixedly coupled to a base plate 604. The arched segment 605 has a cable receiving channel defining a contact surface 606. The cable 110 is received between the contact surface 606 and cable locating member(s) 607, two of which are shown in the embodiments of FIG. 11 as bolts screwed into the base plate 604 at desired locations to define the travel path of the cable 110.

A cutting member 620 is pivotally coupled to the base plate 604 by a mounting bracket 673. The cutting member 620 may be manually moved in a direction $d_5$ to change the orientation of a blade in the cutting member 620 relative to the cable 110. As a result, the cutting member 620 may be pivoted in the direction $d_5$ to facilitate removal of the cutting blade from the cable 110 after an opening 143 is formed in the cable 110. As shown in FIG. 11, the rest state of the cutting member 620 positions the blade relative to the cable 110 so that the blade penetrates into the outer protective jacket 146 of the cable 110.

The embodiments of FIG. 11 further include a securing member 660 that is displaced from the arched segment 605. A drive coupling 650 is included that is configured to move the securing member 660, with a portion of the cable 110 secured therein, from the start position illustrated in FIG. 11 to a finish position. The finished position is closer to the arched segment 605 than the start position and the arched position 605 is positioned between the securing member 660 and the cutting member 620.

Manual activation of the drive coupling 650 by an operator using the handle 652 may be used to repeatedly move the securing member 660 between the start and finish positions to obtain a desired length of an opening in the cable 110 by moving the cable 110 in step increments along the path defined by the arched segment 605 and bolts 607 past the cutting member 620.

The illustrated securing member 660 in the embodiments of FIG. 11 accommodates a variety of cable sizes and secures the cables therein for such stepwise movement of the cable 110 past the cutting member 620. As shown in the embodiments of FIG. 11, the securing member 660 includes an L-shaped base 661 with a J-cam member 662 pivotally mounted thereto for movement about a pivot point/axis 664. A torsional spring 663 is shown configured to return the J-cam member 662 to a rest position when no cable 110 is inserted therein. By rotating an end 662' of the J-cam member 662, a passage may be opened between the J-cam member 662 and the underlying L-shape based 661 to receive a cable 110 on a cable receiving surface 665 of the L-shaped base 661. The J-cam member 662 further includes a directionally serrated face 666 that contacts an outer surface of the cable 110 when it is inserted between the serrated face 666 and the cable receiving surface 665. In addition to accommodating a range of cable outer diameters, the serrated face 666 provides for gripping and movement of the cable with the securing member 660 when moving from a start to finish position to advance the cable past a blade in the cutting member 620, while allowing the serrated face 666 to ride along the outer surface of the cable 110 without moving the cable back again when the securing member 660 shifts back from the finish position to the start position in preparation for an additional incremental stepwise advance of the cable 110 by a next activation of the handle 652.

Also shown in the embodiments of FIG. 11 is an anti-backup member 670 configured to allow a portion of the cable 110 to pass therethrough in a first direction towards the cutting member 620 to receive the cable 110 in the apparatus 600. The anti-backup member 670 includes an angled leaf spring 671 that limits movement of the cable 110 in the second, opposite direction (i.e., towards the securing member 660) to allow the drive coupling 650 to return the securing member 660 to the start position from the finish position without moving the cable 110 away from the cutting member 620. As a result, even if a certain amount of residual loading is applied to the cable 110 by the serrated face 666 during movement from the finish to the start position, the anti-backup member 670 may operate to substantially prevent movement of the cable 110 in the reverse direction. As leaf spring 671 illustrated in FIG. 11 extends from a pivot point fixed to the base plate 604 to an end proximate the arched segment 605 oriented at an angle selected to allow the cable 110 to move along the defined path toward the cutting member 620 and to limit movement of the cable 110 along the defined path away from the cutting member 620.

Figure 12:
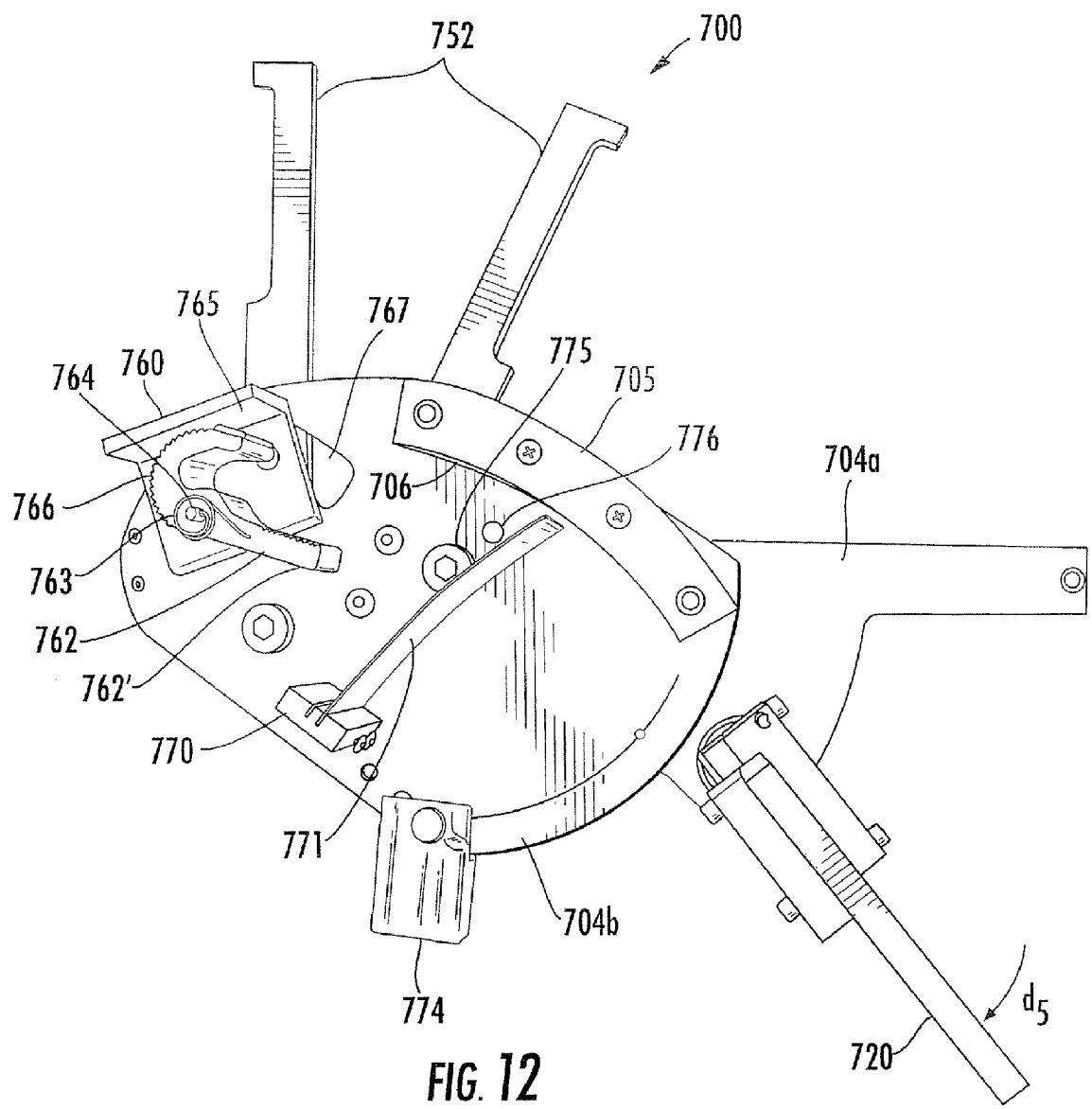
FIG. 12 is a perspective view of an apparatus for accessing a length of a selected one of a plurality of optical fibers within an outer protective jacket of a cable according to further embodiments of the present invention.

Further embodiments of the present invention will now be described with reference to the perspective view of FIG. 12. Like numbered items (e.g., 671, 771) operate substantially as described with reference to FIG. 11 except as described herein with reference to FIG. 12. The embodiments of FIG. 12 generally differ from those described with reference to FIG. 11 in that the arched segment 705 and contact surface 706 defined by the arched segment 705 are positioned on an outer radial surface of the arched segment of the cable 110, rather than an inside surface as illustrated in FIG. 11. The base plate includes a first base plate section 704a coupled to a second base plate section 704b for the embodiments of FIG. 12. Also visible in the embodiments of FIG. 12 is a passage 767 through which the coupling between the handles 752 and the securing member 760 extends to connect the handles 752 to the securing member 760. The passage 767 further accommodates motion of the coupling between the handles 752 and the securing member 760 during motion between the start and finish positions and return to the start position. It will be understood that corresponding features are found in the embodiments of FIG. 11. In addition, the securing member 760 is positioned in a reversed orientation from the securing member 660 to provide a sane orientation relative to the respective arched segment 605, 705.

Also shown in the embodiments of FIG. 12 is a plate 774. The plate 774 is slotted. The slot fits over plate section 704b. Plate 774 attaches to plate section 704a. Plate 774 has a locking pin mechanism that will engage holes that have been drilled into plate section 704b. Plate section 704a may be attached to plate section 704b by a bolt 775 that acts as a pivot point. The plate section 704a may be rotated about this pivot point in the same counter-clockwise direction as $d_5$ so as to move the cutting member 720 out of the way for loading of the cable 110. After the cable 110 is loaded, plate section 104a may be rotated clockwise into a locked position. This action presses the cutting member 720 against the cable 110 and bends the cable 110 around a pin 776 that acts as a pivot point.

Figure 13A:
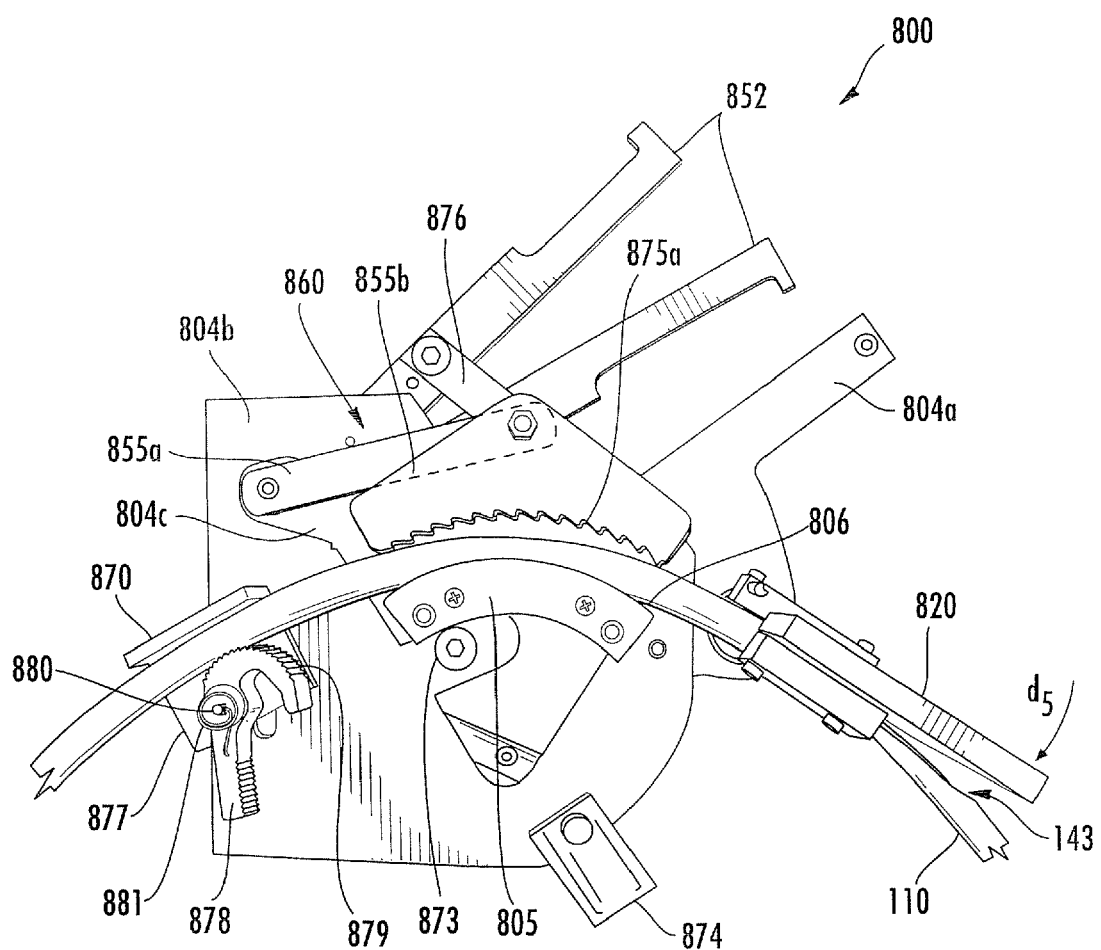
FIG. 13A is a perspective view of an apparatus for accessing a length of a selected one of a plurality of optical fibers within an outer protective jacket of a cable according to further embodiments of the present invention.
Figure 13B:
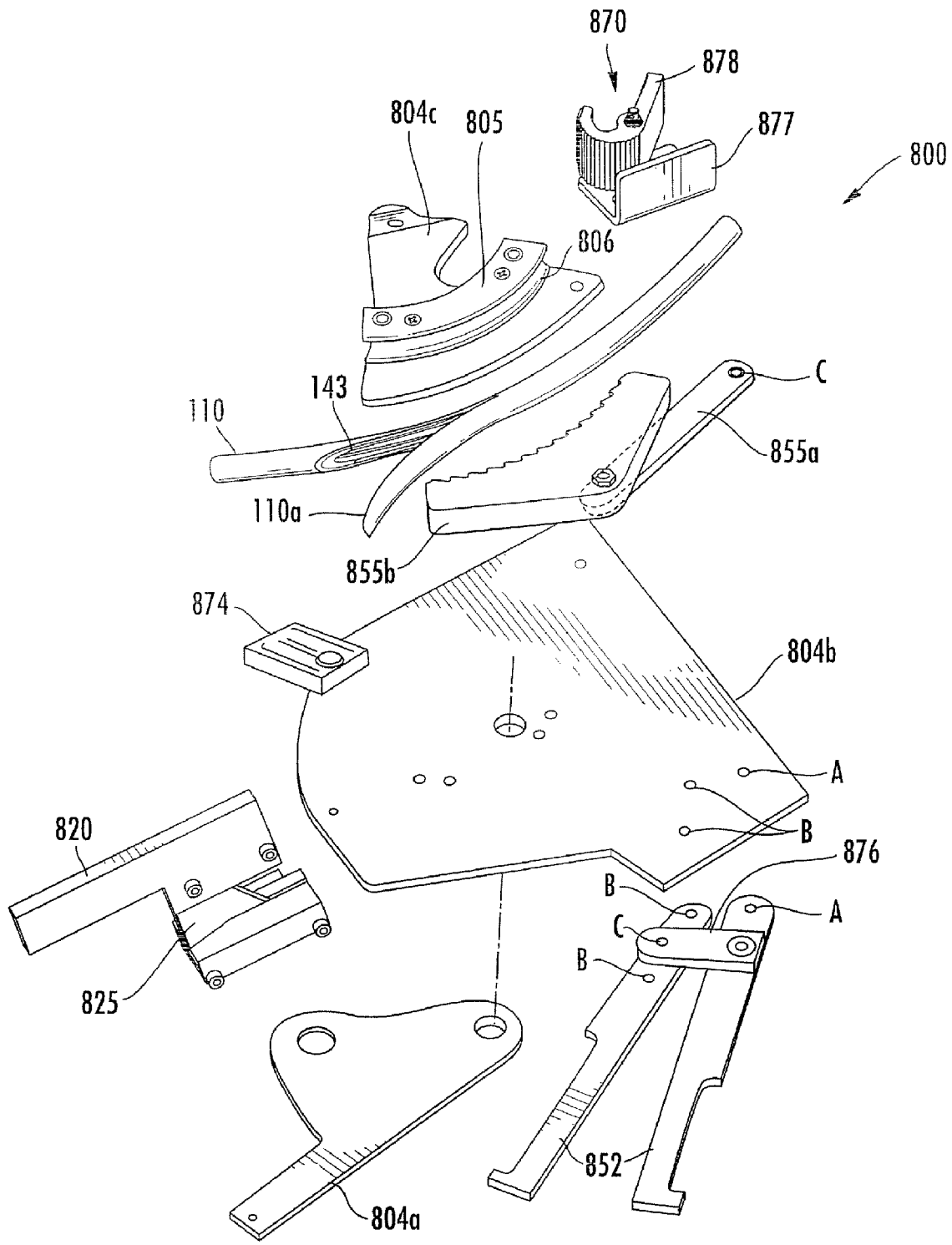
FIG. 13B is an exploded perspective view of the apparatus of FIG. 13A.
Figure 14:
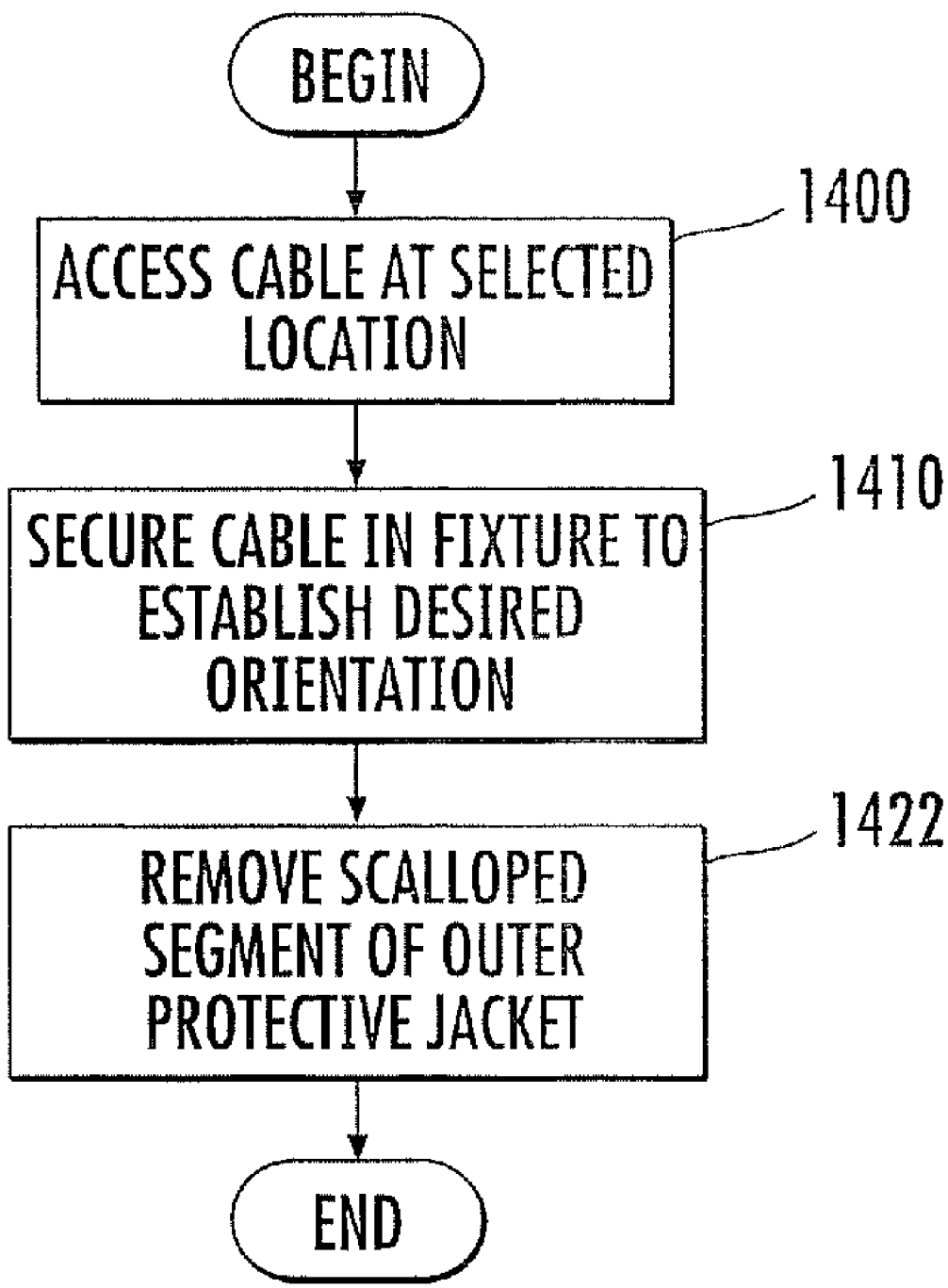
FIGS. 14 and 15 are flowcharts illustrating operations for accessing a length of a selected one of a plurality of optical fibers within an outer protective jacket of a cable according to some embodiments of the present invention.

Further embodiments of an apparatus 800 for accessing a length of a selected one of a plurality of optical fibers 151 within an outer protective jacket 146 of a cable 110 will now be described with reference to FIGS. 13A and 13B. FIG. 13A is a perspective view of the apparatus 800. FIG. 13B is an exploded perspective view of the apparatus 800 of FIG. 13A. The apparatus 800 provides a cable positioning fixture including a pivotally mounted cutting member 820 attached thereto.

Apparatus 800, as with those described previously, receives a cable therein so as to establish a desired orientation of the received portion of the cable 110 in the fixture relative to one or more strength members 145 within the cable while the cutting member 820 removes a scalloped segment 110a from the outer protective jacket 146 of the cable 110. A contact surface 806 on an arched segment 805 of the apparatus 800 receives the portion of the cable 110. As was described previously, in the embodiments of FIGS. 13A and 13B, the cable 110 may include a pair of strength members 145 extending along opposite sides and the desired orientation provided in the apparatus 800 may be with the opposite sides of the cable 110 including the strength members 145 extending in a plane substantially parallel to the abutting contact surface 806 of the apparatus 800. As such a vertical position of the strength member in the portion of the cable relative to the abutting contact surface 806 may limit a vertical depth of the scalloped segment 110a relative to the abutting contact surface 806 by substantially concurrent mechanical interference of the cutting member with both of the strength members.

It will be understood that, as was discussed above, the contact surface 806 may be a channel cross-section shaped contact surface and the plane of the contact surface with reference to which the strength members are oriented may correspond to a plane defined by two contact points between the contact surface and the cable 110. Thus, as described above, wrapping of the cable 110 into an arch abutting the arched segment 805 may be used to orient the cable in the desired position within the apparatus 800 for formation of an opening by removal of the scalloped segment 110a.

The apparatus 800 of FIGS. 13A and 13B differs from the embodiments of FIGS. 10-12 in that the arched segment 805 is part of the securing member 860. The illustrated securing member 860 also includes a plate section 804c, to which the arched segment 805 is connected, and a grip member 855. As seen in the embodiments of FIGS. 13A and 13B, the securing member 860 is driven by a manual drive member, shown as handles 852 in FIGS. 13A and 13B, through a drive coupling 876. Note that, as will be further described herein, the drive coupling 876 operates both to secure the cable 110 in the securing member 860 and to advance the secured cable 110 along a defined path relative to the cutting member 820 to remove the scalloped segment 110a from the outer protective jacket 146 of the cable 110.

The apparatus 800 of FIGS. 13A and 13B further includes an anti-backup member 870. The anti-backup member 870 is configured to allow a secured portion of the cable 110 to pass therethrough in a first direction to receive a portion of the cable 110 in the apparatus 800 and to limit movement of the secured cable in a second opposite direction. Furthermore, the securing member 860 is configured to allow the drive coupling 876 to return the securing member 860 to the start position from the finish position without moving the secured portion of the cable 110 away from the cutting member 820 as described with reference to other embodiments above.

For the embodiments of FIGS. 13A and 13B, both the anti-backup member 870 and the securing member 860 are configured to accommodate a selected range of outer diameters of cable 110 therein. The illustrated securing member 860 includes the grip member 855, which in the illustrated embodiments includes a bar 855a and a toothed arch 855b, which has a serrated face 875a. The bar 855a is positioned between the toothed arch 855b and the plate section 804c. The securing member 860 has an open position, illustrated in FIG. 13A, in which the secured portion of the cable 110 can pass between the grip member 855 and the arched segment 805. The securing member 860 further has a closed position in which the portion of the cable 110 therein is rigidly gripped between the grip member 855 and the arched segment 805. As such, it will be understood that for the embodiments of FIGS. 13A and 13B, the drive coupling 876 operates to provide movement of the grip member 855 to secure the cable 110 as well as movement of the securing member 860 toward the cutting member 820 to remove a desired length per step incremental advancement of the outer projected jacket 146 to remove the desired size scalloped segment 110a and form an opening allowing access to optical fibers 151 within the cable 110. In some embodiments, the drive member 876 is particularly configured to move the securing member 860 from the open position to the closed position before moving the secured portion of the cable 110 along the defined path relative to the cutting member 820.

The apparatus 800 includes the cutting member 820 pivotally coupled to a first base plate section 804a for movement between a cutting orientation selected to cut into the outer protective jacket 146 when the cable 110 is moved along the defined path, as illustrated in FIG. 13A and an extracted orientation selected to allow removal of the cutting member 820 from the outer protective jacket 146. More particularly, as described previously, the cutting member 820 may be pivotally rotated in a direction $d_5$ to facilitate removal of the cutting blade of the cutting member 820 from the outer protective jacket 146 on completion of forming the opening 143.

The first base plate section 804a is attached to a second base plate section 804b by a bolt 873 that acts as a pivot point for movement therebetween. The securing member 860 is secured to the second base plate section 804b. An anti-backup member 870 is mounted into a vertical slot in the plate section 804b. In some embodiments, the anti-backup member 870 is allowed to float vertically and is not rigidly secured. Plate 874 operates substantially as described with reference to plate 774 in the embodiments of FIG. 12. Plate section 804a corresponds to plate section 704a of FIG. 12. Cutting member 820 corresponds to cutting member 720 of FIG. 12. These 3 components form a subassembly that performs substantially as described previously with reference to like numbered items of FIG. 12. The arched segment 805 is attached to the plate 804c. The bar 855a of the grip member 855 is a linkage that attaches to the plate 804c and the arched segment 805 to the grip member 855 at the same point C as the drive coupling 876.

While the anti-backup member 870 illustrated for the embodiments of FIGS. 13A and 13B appears and is structured in a manner substantially identical to the securing member 660, 760 of FIGS. 11 and 12, the anti-backup member 870 operates with reference to movement of the cable 110 substantially as described with reference to the anti-backup member 670, 770 of FIGS. 11 and 12. The anti-backup member 870 includes an L-shaped base 877 and a J-cam member 878 pivotally connected to the L-shaped base 877 about a pivot point/axis 880. A clock type spring 881 is provided to maintain the J-cam member 878 in a compressed or closed orientation relative to the L-shaped base 877. A directionally serrated face 879 is provided on the J-cam member 878 on a surface contacting a cable 110 when the J-cam member 878 is rotated to provide an opening between the L-shaped base 877 and the surface of the J-cam member 662 to allow a cable 110 to be passed therebetween as seen in FIG. 13A, after which the J-cam member 878 is released and the torsion spring 881 returns the J-cam member 878 to the orientation shown in FIG. 13A with the serrated face 879 contacting the outer diameter surface of the cable 110.

As such, the cable 110 can be advanced with the securing member 860 substantially freely in a first direction towards the cutting member 820 while movement of the cable 110 in the opposite direction, while the securing member 860 is returned from the finish position to the start position, is substantially prevented by the anti-backup member 870. It will be understood that, during the movement from the finish position to the start position of the securing member 860, releasing of the handles 852 releases a force transmitted through the drive coupling 876 and allows the grip member 855 to release and slide along the cable 110 without driving the cable 110 in the reverse direction. Note that a cutting blade 825 in a cutting member 820 are visible in the exploded perspective view of FIG. 13B. Drive coupling 876 is in the same plane as base plate section 804b and a cut away is provided to allow space for drive coupling 876.

Figure 18A:
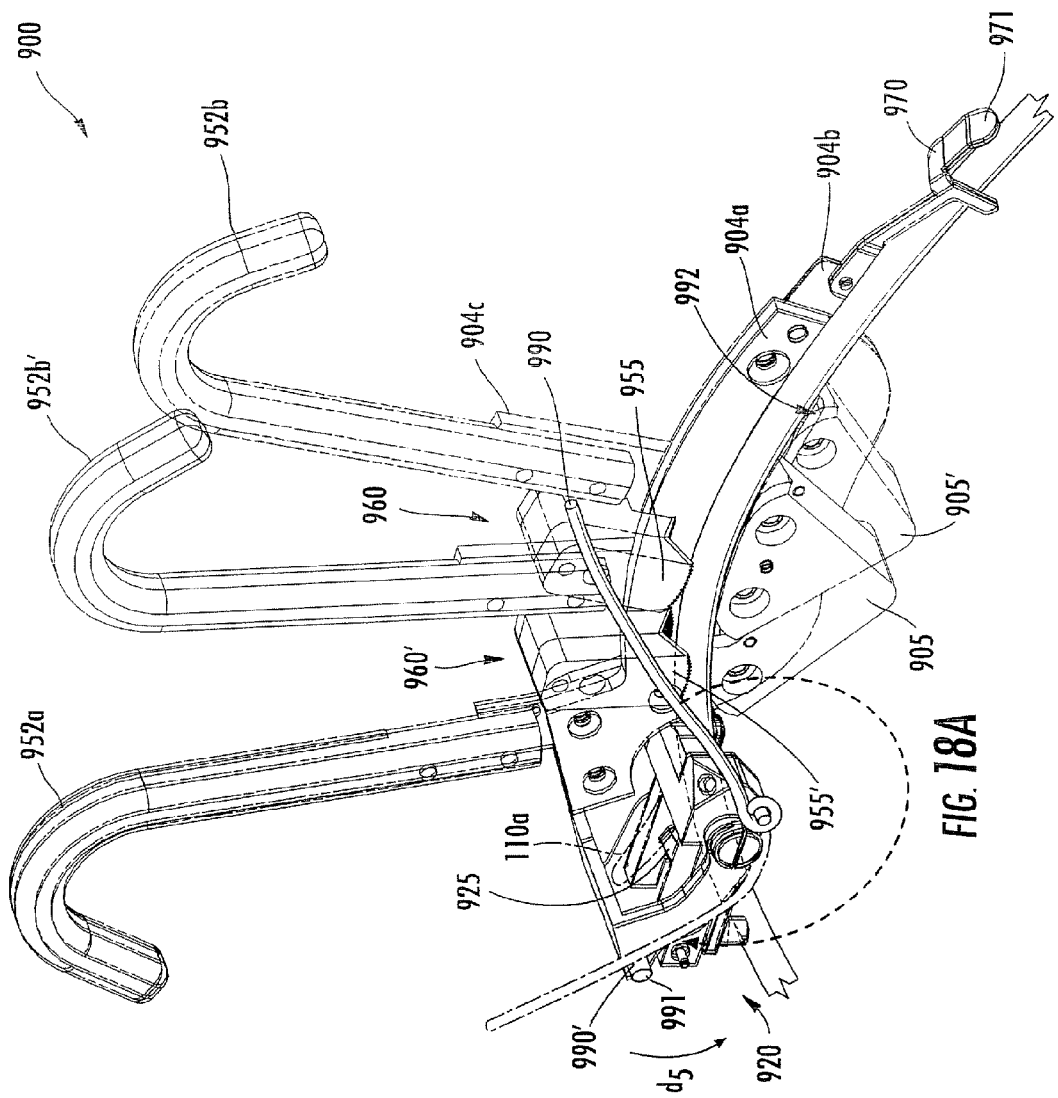
FIG. 18A is a perspective view of an apparatus for accessing a length of a selected one of a plurality of optical fibers within an outer protective jacket of a cable according to further embodiments of the present invention.
Figure 18B:
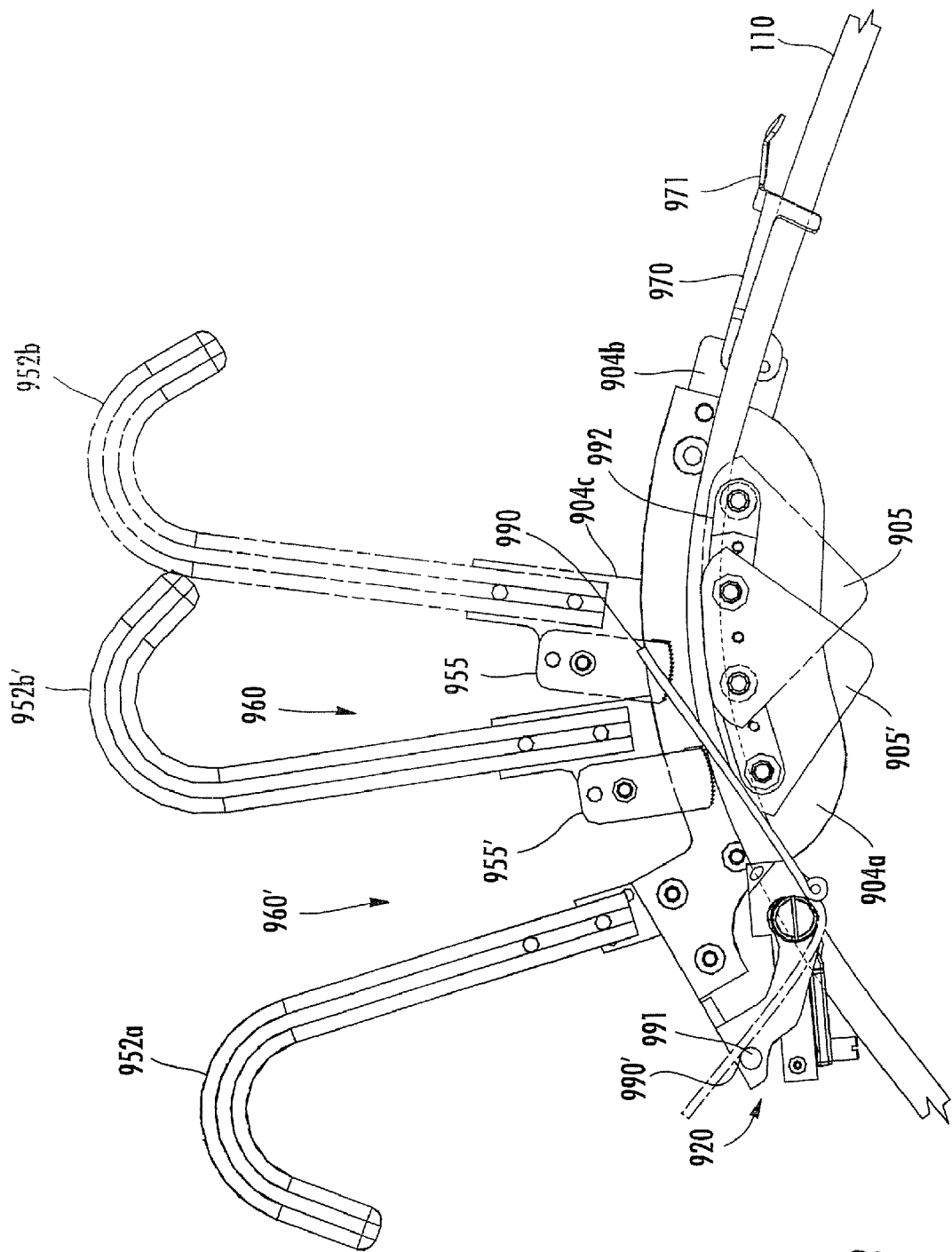
FIG. 18B is a plan view of the apparatus of FIG. 18A.

Further embodiments of an apparatus 900 for accessing a length of a selected one of a plurality of optical fibers 151 within an outer protective jacket 146 of a cable 110 will now be described with reference to FIGS. 18A and 18B. FIG. 18A is a perspective view of the apparatus 900. FIG. 18B is a front view of the apparatus 900 of FIG. 18A. In both figures the apparatus is shown in both a starting orientation and an advanced orientation (i.e, handle 952b and features moving therewith shown in an advanced orientation as handle 952b' etc.). The apparatus 900 provides a cable positioning fixture including a pivotally mounted cutting member 920 attached to a plate section 904a thereof.

Apparatus 900, as with those described previously, receives a cable therein so as to establish a desired orientation of the received portion of the cable 110 in the fixture relative to one or more strength members 145 within the cable while the cutting member 920 removes a scalloped segment 110a from the outer protective jacket 146 of the cable 110. An arched segment 905, 905' of the apparatus 900 receives the portion of the cable 110. As was described previously, in the embodiments of FIGS. 18A and 18B, the cable 110 may include a pair of strength members 145 extending along opposite sides and the desired orientation provided in the apparatus 900 may be with the opposite sides of the cable 110 including the strength members 145 extending in a plane substantially parallel to an abutting contact surface on the arched segment 905, 905' of the apparatus 900. As such, a vertical position of the strength member in the portion of the cable relative to the abutting contact surface may limit a vertical depth of the scalloped segment 110a relative to the abutting contact surface by substantially concurrent mechanical interference of the cutting member with both of the strength members.

The apparatus 900 of FIGS. 18A and 18B is illustrated as having a securing member 960, 960', including the arched segment 905, 905' and a grip member 955, 955'. The illustrated securing member 960, 960' also includes a plate section 904c, to which the arched segment 905, 905' is connected. As seen in the embodiments of FIGS. 18A and 18B, the securing member 960, 960' is driven by a manual drive member, shown as handles 952a and 952b, 952b' in FIGS. 18A and 18B, through the drive coupling plate section 904c. Note that actuation of the handle 952b, 952b' towards the handle 952a may operate both to secure the cable 110 in the securing member 960, 960' and to advance the secured cable 110 along a defined path relative to the cutting member 920 to remove the scalloped segment 110*a* from the outer protective jacket 146 of the cable 110.

The apparatus 900 of FIGS. 18A and 18B further includes an anti-backup member 970. The anti-backup member 970 is configured to allow a secured portion of the cable 110 to pass therethrough in a first direction to receive a portion of the cable 110 in the apparatus 900 and to limit movement of the secured cable in a second opposite direction. Furthermore, the securing member 960 is configured to allow the drive coupling plate section 904*c* to return with the securing member 960, 960' to the start position from the finish position without moving the secured portion of the cable 110 away from the cutting member 920 as described with reference to other embodiments above. A finger lift handle 971 is shown that may be used to facilitate placement of the cable 110 in the anti-backup member 970. The anti-backup member 970 is coupled to the plate section 904*a* through the plate section 904*b*, allowing adjustment of the position thereof relative to the cutting member 920.

The apparatus 900 includes the cutting member 920 pivotally coupled to the first base plate section 804*a* for movement between a cutting orientation selected to cut into the outer protective jacket 146 when the cable 110 is moved along the defined path, as illustrated in FIG. 18A and an extracted orientation selected to allow removal of the cutting member 920 from the outer protective jacket 146. More particularly, as described previously, the cutting member 920 may be pivotally rotated in a direction $d_5$ to facilitate removal of the cutting blade of the cutting member 920 from the outer protective jacket 146 on completion of forming the opening 143. Also shown in FIGS. 18A and 18B is a spring member 990, 990' for imposing a force to aid movement of the cutting blade 925 from the outer protective jacket. In the position shown as spring member 990, no rotational force is imposed. In the position shown as spring member 990' with the spring member 990' positioned under the pin 991, a rotational force is imposed so the cutting blade 925 will be removed from the cable 110 as the cable 110 advances relative to the cutting blade 925.

Embodiments of methods of accessing an optical fiber within an optical fiber cable will now be described with reference to the flowchart illustrations of FIGS. 14-17. Referring first to the flowchart illustration of FIG. 14, operations begin at block 1400 by accessing a portion of the cable at a selected location. The cable includes a plurality of optical fibers and at least one strength member extending longitudinally within an outer protective jacket as seen, for example, in FIGS. 3-5.

The portion of the cable is secured in a fixture configured to establish desired orientation of the secured portion of the cable in the fixture relative to the one or more strength members therein (block 1410). For example, the cable may be an outdoor optical fiber cable with a pair of strength member 145 extending along opposite sides of the cable as seen in FIG. 3. The desired orientation may be with the opposite sides of the cable including the strength members extending in a plane substantially parallel to an underlying contact surface of the fixture.

A scalloped segment of the outer protective jacket is removed at a selected location on the portion of the cable while a portion is secured in the fixture without cutting any of the plurality of optical fibers or the one or more strength members to provide an opening allowing access to the optical fibers (block 1420). For a cable including two strength members extending along opposite sides of the cable, operations at block 1420 may include forming the opening to a vertical depth relative to the underlying contact surface not exceeding a vertical position of the strength members in the portion of the cable. More generally, removing the scalloped section at block 1420 may include advancing a cutting member longitudinally along the portion of the cable while advancing the cutting member into the portion of the cable until the cutting member contacts the strength members to establish the vertical depth of the scalloped segment.

It will be understood that advancing a cutting member longitudinally along the portion of the cable may include moving the cutting member past the cable or the cable member past the cutting member or a combination of both movements resulting in relative longitudinal movement of the cutting member along the cable.

Figure 15:
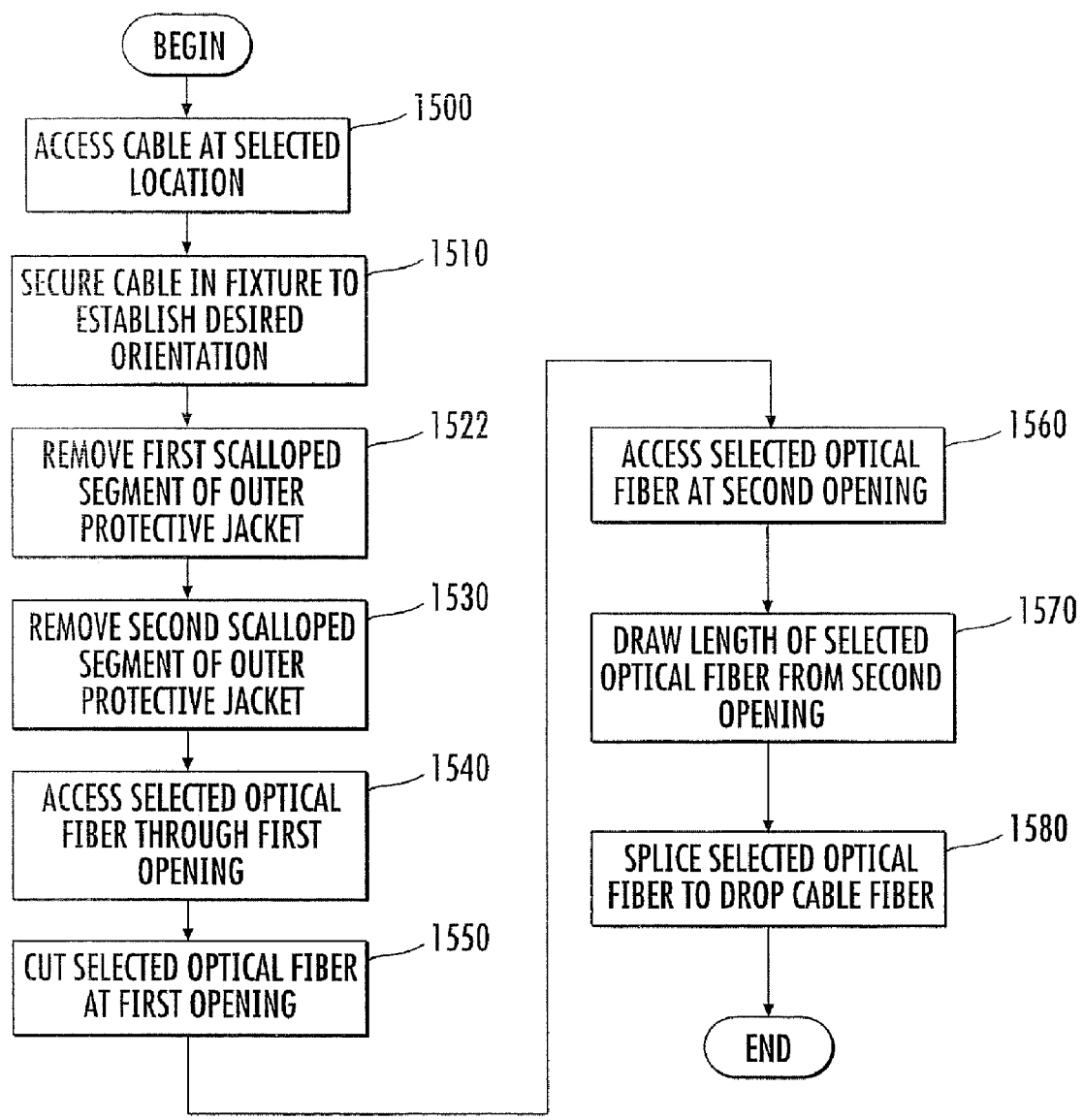

Further embodiments of the present invention will now be described with reference to the flowchart illustration of FIG. 15. More particularly, the method described with reference to FIG. 15 relates to embodiments in which two longitudinally displaced openings are formed for accessing a selected length of one or more optical fibers within a cable rather than a single opening. As described previously, a portion of the cable is accessed at a selected location (block 1500). The portion of the cable is secured in a fixture configured to establish a desired orientation of the cable in the fixture relative to strength member or members therein (block 1510). A first scalloped segment of the outer protective jacket of the cable is removed at a selected location on the cable while the cable is secured in the fixture without cutting any of the optical fibers or the one or more strength members to provide a first opening allowing access to the optical fibers (block 1520).

A second scalloped segment of the outer protective jacket is removed at a second location on the accessed portion of the cable (block 1530). The second location is longitudinally displaced from the first location. In some embodiments of the present invention, a single arched segment of the fixture is used when removing both the first and second scalloped segments. As such, removing the second scalloped segment at block 530, may include releasing the secured portion of the cable from its secured orientation in the fixture after removing the first scalloped segment. The cable is then moved longitudinally relative to the fixture a distance selected to provide a desired displacement between the first and second openings and the cable is then re-secured in the fixture at the desired orientation before removing the second scalloped segment.

In other embodiments, a fixture, such as the apparatus 100 of FIG. 1, may be used and both scalloped segments may be removed without releasing and re-securing the cable 110. As noted above, in such embodiments, the respective arched segments may be displaced by a distance selected to provide the desired distance between the first and second openings.

A selected one or more of the optical fibers is accessed through the first opening (block 1540). The selected one or more optical fibers are cut at the first opening (block 1550). The selected one or more optical fibers are accessed at the second opening (block 1560) and the length of the selected one or more of the optical fibers is drawn from the second opening to provide the second length of the selected one or more optical fibers extending from the second opening (block 1570). The selected length of drawn fibers may be spliced to another optical fiber such as an optical fiber of a drop cable (block 1580).

As was described above relative to various apparatus, an actuable cutting member may be used and removing the first and/or second scalloped segments at blocks 1520 and/or 1530 may include actuating the cutting member to remove the scalloped segments while moving along the defined path in the fixture. Furthermore, the fixture may include a driving coupling linked to the cutting member so that movement of the drive coupling moves the cutting member along the defined path and the method may further include coupling a power drive to the driving coupling and actuating the power drive to move the cutting member along the defined path. However, as noted above, manual activation and/or movement of the cable rather than the cutting member to provide the relative movement therebetween may also be used to form the openings in various embodiments of the present invention.

Figure 16:
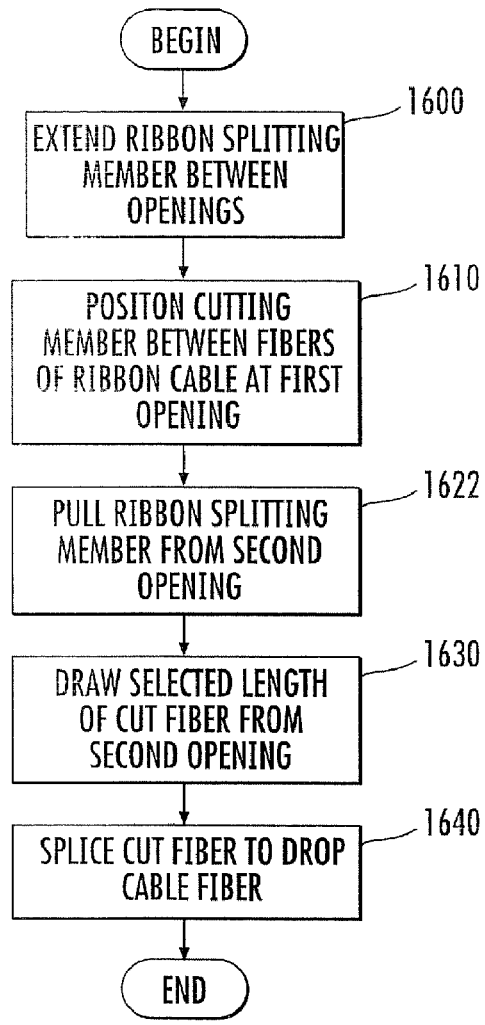
FIG. 16 is a flowchart illustrating operations for splitting an optical fiber ribbon within an outer protective jacket of a cable according to some embodiments of the present invention.

Further embodiments of the present invention will now be described with reference to FIG. 16. In particular, FIG. 16 illustrates operations for selecting ones of the optical fibers included in an optical fiber ribbon. As discussed above, methods of accessing a fiber as described herein may include accessing and one or more of the optical fibers within a ribbon, without cutting other fibers within the ribbon. In such embodiments, drawing a selected length of the optical fiber at block 1570 of FIG. 15 may include the operations that will now be describe with reference to FIG. 16.

As seen in the embodiments of the flowchart of FIG. 16, operations for splitting an optical fiber ribbon within an outer protective jacket of a cable begin by extending a ribbon splitting member within the outer protective jacket between a first opening and a second opening in the outer protective jacket proximate the ribbon (block 1600). A cutting member at a first longitudinal end of the ribbon splitting member is positioned between a cut one (or more) of the plurality of optical fibers in the ribbon and other ones of the optical fibers in the ribbon in the first opening (block 1610). A second, opposite longitudinal end of the ribbon splitting member is pulled from the second opening to advance the cutting member within the outer protective jacket from the first opening to the second opening to separate a selected length of the cut one(s) of the plurality of optical fibers from the other ones of the optical fibers in the ribbon (block 1620). It will be understood that the one or more of the fibers referred to as a cut fiber herein refers to the fibers to be cut and the cut need not have occurred until after splitting the respective ribbon fibers. The cut drawn fibers may be spliced to a drop cable fiber (block 1640).

Figure 17:
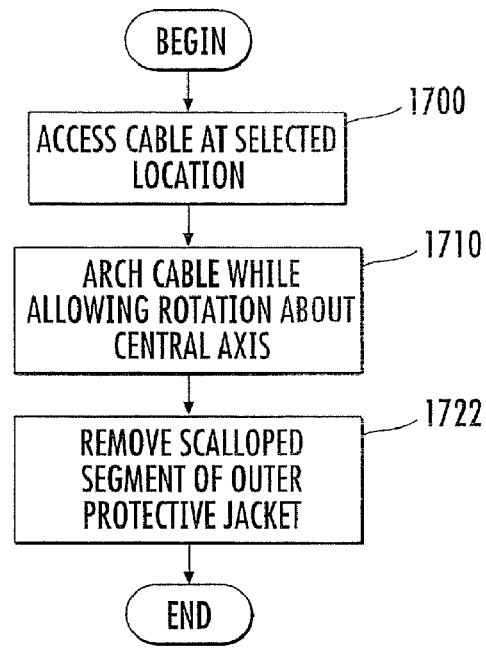
FIG. 17 is a flowchart illustrating operations for accessing a length of a selected one of a plurality of optical fibers within an outer protective jacket of a cable according to some embodiments of the present invention.

Further embodiments of the present invention will now be described with reference to FIG. 17. In particular, FIG. 17 illustrates operations for accessing an optical fiber within an optical fiber cable. Operations for the illustrated embodiments begin at block 1700 with accessing a portion of the cable at a selected location. The cable includes a plurality of optical fibers and a pair of strength members extending longitudinally within an outer protective jacket along opposite sides of the cable. The portion of the cable is arched while allowing rotation about a central axis of the cable to establish a desired orientation of the portion of the cable relative to the pair of strength members (block 1710). A scalloped segment of the outer protective jacket is removed at a selected location on the portion of the cable while the portion is in the desired orientation without cutting any of the plurality of optical fibers or the pair of strength members to provide an opening (block 1720). The desired orientation is with the opposite sides of the cable including the strength members positioned at a substantially same vertical position relative to a cutting member used to remove the scalloped segment. Operations at block 1720 include forming the opening with the cutting member to a vertical depth not exceeding the vertical position of the strength members in the portion of the cable.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An apparatus for accessing a length of a selected one of a plurality of optical fibers within an outer protective jacket of a cable including a buffer tube with the plurality of optical fibers therein and a pair of strength members outside the buffer tube and extending longitudinally along opposite sides of the cable, the apparatus comprising:
a cable positioning fixture configured to receive a portion of the cable therein and to establish a desired orientation of the portion of the cable in the fixture relative to the pair of strength members therein while a cutting member removes a scalloped segment from the outer protective jacket and the buffer tube.

2. The apparatus of claim 1, wherein the desired orientation is with the opposite sides of the cable including the strength members extending in a plane with each of the strength members displaced by a substantially same vertical distance from a path followed by the cutting member relative to the portion of the cable when removing the scalloped segment so that a vertical position of the strength members in the portion of the cable relative to the path followed by the cutting member limits a vertical depth of the scalloped segment by substantially concurrent mechanical interference of the cutting member with both of the strength members.

3. The apparatus of claim 1, wherein the cable positioning fixture includes an arched segment and the cable positioning fixture is configured to receive the portion of the cable wrapped into an arch abutting the arched segment to orient the cable in the desired orientation.

4. The apparatus of claim 3, wherein the cable positioning fixture further includes a drive coupling configured to move the portion of the cable along a defined path relative to the cutting member to remove the scalloped segment from the outer protective jacket and a securing member to limit movement of the portion of the cable relative to the drive coupling while the portion of the cable is moved along the defined path.

5. The apparatus of claim 4, wherein the securing member includes the arched segment and wherein the cable positioning fixture further includes an anti-backup member configured to allow the portion of the cable to pass therethrough in a first direction to receive the portion of the cable in the cable positioning fixture and to limit movement of the portion of the cable in a second, opposite, direction and wherein the securing member is configured to allow the drive coupling to return the securing member to the start position from the finish position without moving the portion of the cable away from the cutting member.

6. The apparatus of claim 4, wherein the securing member includes the arched segment and wherein the securing member further includes a grip member, the securing member having an open position in which the portion of the cable can pass between the grip member and the arched segment and a closed position in which the portion of the cable is rigidly gripped between the grip member and the arched segment.

7. The apparatus of claim 6, wherein the drive member is further configured to move the securing member from the open position to the closed position before moving the portion of the cable along the defined path.

8. The apparatus of claim 4, wherein the cable positioning fixture further includes the cutting member and wherein the cutting member is pivotally coupled to the cable positioning member for movement between a cutting orientation selected to cut into the outer protective jacket when the portion of the cable is moved along the defined path and an extracted orientation selected to allow removal of the cutting member from the outer protective jacket.

9. The apparatus of claim 4, wherein the drive coupling is configured to move the securing member with the portion of the cable secured therein from a start position to a finish position, wherein the finish position is closer to the cutting member than the start position and wherein the drive coupling is configured to repeatedly move the securing member with the portion of the cable therein from the start position to the finish position to provide a longitudinal length of the scalloped segment exceeding a longitudinal displacement of the portion of the cable when the securing member is moved from the start position to the finish position.

10. The apparatus of claim 4, wherein the securing member is displaced from the arched segment and wherein the drive coupling is configured to move the securing member with the portion of the cable secured therein from a start position to a finish position, wherein the finish position is closer to the arched segment than the start position and wherein the arched segment is positioned between the securing member and the cutting member.

11. The apparatus of claim 10, wherein the cable positioning fixture further includes an anti-backup member configured to allow the portion of the cable to pass therethrough in a first direction to receive the portion of the cable in the cable positioning fixture and to limit movement of the portion of the cable in a second, opposite, direction and wherein the securing member is configured to allow the drive coupling to return the securing member to the start position from the finish position without moving the portion of the cable away from the cutting member.

12. The apparatus of claim 11, wherein the anti-backup member comprises a leaf spring extending from a pivot point fixed to the cable positioning fixture to an end proximate the arched segment and oriented at an angle selected to allow the portion of the cable to move along the defined path toward the cutting member and to limit movement of the portion of the cable along the defined path away from the cutting member.

13. The apparatus of claim 1, wherein the cable positioning fixture is configured to allow rotation about a central axis of the cable to establish the desired orientation with a selected rotational orientation of the portion of the cable relative to the pair of strength members.

14. The apparatus of claim 3, wherein the cable positioning fixture includes a securing member that secures the portion of the cable wrapped into the arch around the arched segment and wherein the cable positioning fixture includes two arched segments displaced by a distance selected to provide a desired distance between two scalloped segments removed from the cable by the cutting member without moving the portion of the main cable from its secured orientation in the cable positioning fixture.

15. The apparatus of claim 3 wherein the cable positioning fixture further comprises an actuable cutting member movably connected to the arched segment for movement along a defined path relative thereto to cause the cutting member to remove the scalloped segment while moving along the defined path when actuated.

16. The apparatus of claim 15, wherein the cable positioning fixture further comprises a drive coupling linked to the cutting member so that movement of the drive coupling moves the cutting member along the defined path and wherein the drive coupling comprises a rotary drive coupling and wherein the fixture further comprises a translation mechanism that translates rotation of the drive coupling to movement of the cutting member along the defined path.

17. The apparatus of claim 15, wherein the fixture further comprises a cable positioning roller coupled to the cutting member for movement therewith and oriented to press the portion of the cable into a determinate position relative to the cutting member while the cutting member removes the scalloped segment.

18. The apparatus of claim 15, wherein the fixture further comprises a load responsive attachment member that connects the cutting member to the arched segment to control the vertical depth of the scalloped segment by limiting penetration of the cutting member into the portion of the cable responsive to a load on the cutting member imparted by the portion of the cable during movement of the cutting member along the defined path.

19. The apparatus of claim 15, wherein the fixture further comprises a clamp member having a closed position that secures the portion of the cable to the arched segment and an open position that releases the portion of the cable from the arched segment and wherein the clamp member comprises a movable securing member, a clamp drive coupling and a clamp translation mechanism that translates rotary movement of the clamp drive coupling to movement of the securing member between the open and closed positions.

20. The apparatus of claim 19, wherein the cable positioning fixture further comprises a cutting member drive coupling linked to the cutting member so that movement of the cutting member drive coupling moves the cutting member along the defined path and a cutting member translation mechanism that translates rotary movement of the drive coupling to movement of the cutting member along the defined path and wherein the clamp drive coupling and the cutting member drive coupling are configured for activation by a same driver.

21. The apparatus of claim 15, wherein the cable positioning fixture further comprises a cutting member drive coupling linked to the cutting member so that movement of the cutting member drive coupling moves the cutting member along the defined path and a cutting member translation mechanism that translates rotary movement of the drive coupling to movement of the cutting member along the defined path, wherein the translation mechanism comprises:
  a threaded screw member; and
  a cutting member mounting block mounted on the screw member for linear movement along the screw member responsive to rotary movement of the screw member, wherein the cutting member is connected to the cutting member mounting block.

22. The apparatus of claim 1, wherein the plurality of optical fibers comprises an optical fiber ribbon including the selected one of the plurality of optical fibers and wherein the apparatus further comprises a ribbon splitting member sized to extend movably within the outer protective jacket proximate the ribbon, the ribbon splitting member having a cutting member at a first longitudinal end thereof, configured to travel between the selected one of the plurality of optical fibers and others of the optical fibers in the ribbon, and a second, opposite, longitudinal end displaced by a longitudinal distance selected to separate a selected length of the selected one of the plurality of fibers from the others of the optical fibers in the ribbon.

23. An apparatus for accessing a length of a selected one of a plurality of optical fibers within an outer protective jacket of a cable including the plurality of optical fibers and at least one strength member extending longitudinally therein, the apparatus comprising:
    a cable positioning fixture configured to receive a portion of the cable therein and to establish a desired orientation of the portion of the cable in the fixture relative to the at least one strength member therein while a cutting member removes a scalloped segment from the outer protective jacket; and
    wherein the at least one strength member comprises a pair of strength members extending along opposite sides of the cable and wherein the desired orientation is with the opposite sides of the cable including the strength members extending in a plane with each of the strength members displaced by a substantially same vertical distance from the cutting member when the portion of the cable is moved along a defined path relative to the cutting member to remove the scalloped segment from the outer protective jacket so that a vertical position of the strength members in the portion of the cable relative to the path followed by the cutting member limits a vertical depth of the scalloped segment by substantially concurrent mechanical interference of the cutting member with both of the strength members.

24. A method of accessing an optical fiber within an optical fiber cable, comprising:
    accessing a portion of the cable at a selected location, wherein the cable includes a buffer tube with a plurality of optical fibers and a pair of strength members outside the buffer tube and extending longitudinally along opposite sides of the cable within an outer protective jacket;
    securing the portion of the cable in a fixture configured to establish a desired orientation of the portion of the cable in the fixture relative to the pair of strength member members therein; and
    removing a scalloped segment of the outer protective jacket and the buffer tube at a selected location on the portion of the cable while the portion is secured in the fixture without cutting any of the plurality of optical fibers or the pair of strength member members to provide an opening allowing access to the plurality of optical fibers.

25. The method of claim 24, further comprising accessing a selected one of the plurality of optical fibers through the opening.

26. The method of claim 24, wherein the cable comprises an outdoor cable and wherein the desired orientation is with the opposite sides of the cable including the strength members extending in a plane substantially parallel to an underlying contact surface of the fixture and wherein removing the scalloped segment comprises forming the opening to a vertical depth relative to the underlying contact surface not exceeding a vertical position of the strength members in the portion of the cable.

27. The method of claim 26, wherein removing the scalloped section comprises advancing a cutting member longitudinally along the portion of the cable while advancing the cutting member into the portion of the cable until the cutting member contacts the strength members to establish the vertical depth of the scalloped segment.

28. The method of claim 24, wherein removing the scalloped segment comprises removing a first scalloped segment and the opening comprises a first opening and the selected location comprises a first location and wherein the method further comprises:
    removing a second scalloped segment of the outer protective jacket and the buffer tube at a second location on the portion of the cable, longitudinally displaced from the first location, while the portion is secured in the fixture without cutting any of the plurality of optical fibers or the strength members to provide a second opening;
    accessing a selected one of the plurality of optical fibers through the first opening;
    cutting the selected one of the plurality of optical fibers at the first opening;
    accessing the selected one of the plurality of optical fibers at the second opening; and
    drawing a length of the selected one of the plurality of optical fibers from the second opening to provide a selected length of the selected one of the plurality of optical fibers extending from the second opening to be spliced to another optical fiber.

29. A method of accessing an optical fiber within an optical fiber cable, comprising:
    accessing a portion of the cable at a selected location, wherein the cable includes a buffer tube with the plurality of optical fibers therein and a pair of strength members outside the buffer tube and extending longitudinally within an outer protective jacket along opposite sides of the cable;
    arching the portion of the cable while allowing rotation about a central axis of the cable to establish a desired orientation of the portion of the cable relative to the pair of strength members;
    removing a scalloped segment of the outer protective jacket and the buffer tube at a selected location on the portion of the cable while the portion is in the desired orientation without cutting any of the plurality of optical fibers or the pair of strength members to provide an opening, wherein the desired orientation is with the opposite sides of the cable including the strength members positioned at a substantially same vertical position relative to a cutting member used to remove the scalloped segment and wherein removing the scalloped segment comprises forming the opening with the cutting member to a vertical depth not exceeding the vertical position of the strength members in the portion of the cable.

30. The method of claim 29, wherein the cable comprises an outdoor cable and wherein the desired orientation is with the opposite sides of the cable including the strength members extending in a plane substantially parallel to an underlying contact surface of the fixture and wherein removing the scalloped segment comprises forming the opening to a vertical depth relative to the underlying contact surface not exceeding a vertical position of the strength members in the portion of the cable.

31. The method of claim 30, wherein removing the scalloped section comprises advancing a cutting member longitudinally along the portion of the cable while advancing the cutting member into the portion of the cable until the cutting member contacts the strength members to establish the vertical depth of the scalloped segment.

* * * * *